(12) United States Patent
Reid

(10) Patent No.: US 10,873,658 B2
(45) Date of Patent: Dec. 22, 2020

(54) CONFIGURABLE MULTI-FUNCTION RUGGEDIZED VOICE OVER INTERNET PROTOCOL (VOIP) COMMUNICATIONS DEVICE WITH UNIVERSAL APPLICATION PLATFORM

(71) Applicant: Hubbell Incorporated, Shelton, CT (US)

(72) Inventor: Jeff T. Reid, Sinking Spring, PA (US)

(73) Assignee: HUBBELL INCORPORATED, Shelton, CT (US)

(*) Notice: Subject to any disclaimer, the term of this patent is extended or adjusted under 35 U.S.C. 154(b) by 0 days.

(21) Appl. No.: 15/998,513

(22) Filed: Aug. 16, 2018

(65) Prior Publication Data

US 2019/0058783 A1 Feb. 21, 2019

Related U.S. Application Data

(60) Provisional application No. 62/581,247, filed on Nov. 3, 2017, provisional application No. 62/546,864, filed on Aug. 17, 2017.

(51) Int. Cl.
*H04M 1/18* (2006.01)
*H04M 1/253* (2006.01)
(Continued)

(52) U.S. Cl.
CPC ........ *H04M 1/185* (2013.01); *G06F 3/03547* (2013.01); *G06F 3/0412* (2013.01);
(Continued)

(58) Field of Classification Search
CPC . H04L 29/06027; H04M 7/006; H04M 3/567; H04M 1/2535; H04M 1/185; G06F 3/0416; G06F 3/0412
See application file for complete search history.

(56) References Cited

U.S. PATENT DOCUMENTS

2003/0058806 A1   3/2003   Meyerson et al.
2005/0074031 A1*  4/2005   Sunstrum ............ H04M 1/2535
                                                              370/493
(Continued)

FOREIGN PATENT DOCUMENTS

WO    2016100795 A1    6/2016

OTHER PUBLICATIONS

International Search Report and Written Opinion of the International Searching Authority dated Jan. 9, 2019, which issued in the corresponding PCT Patent Application No. PCT/US2018/000221.

*Primary Examiner* — Margaret G Mastrodonato
(74) *Attorney, Agent, or Firm* — Dickinson Wright PLLC

(57) ABSTRACT

A configurable, multi-function IP-based communication product has a touch screen display and common hardware set form factor that can be configured for use in any of a plurality of operational modes and can be ruggedized for use in harsh environments. The common hardware set form factor enables the IP-based communication product to be optimized for commercial use, that is, easily adapted for different applications and environments using a minimal number of housing configurations or features (e.g., tactile buttons or dials). The operational modes can include, but are not limited to, VoIP telephone, video streaming for video calls, intercom, alarm activation for a central public address/general alarm (PA/GA) system, a "serverless" page-party (SP2) system, voice product with FLASH, product with conference function, on-board communications device, and so on.

24 Claims, 22 Drawing Sheets

(51) Int. Cl.
 *G06F 3/041* (2006.01)
 *G06F 3/0354* (2013.01)
 *H04L 29/06* (2006.01)
 *H04M 3/56* (2006.01)

(52) U.S. Cl.
 CPC ..... *H04M 1/2535* (2013.01); *H04L 29/06027* (2013.01); *H04M 3/567* (2013.01); *H04M 2250/22* (2013.01)

(56) References Cited

U.S. PATENT DOCUMENTS

| | | | |
|---|---|---|---|
| 2008/0048851 A1* | 2/2008 | Reyes | G08B 7/06 340/506 |
| 2008/0310609 A1 | 12/2008 | Brady, Jr. et al. | |
| 2014/0297418 A1 | 10/2014 | Gaur | |
| 2015/0063192 A1 | 3/2015 | Zukas et al. | |
| 2017/0038915 A1 | 2/2017 | Choi et al. | |

* cited by examiner

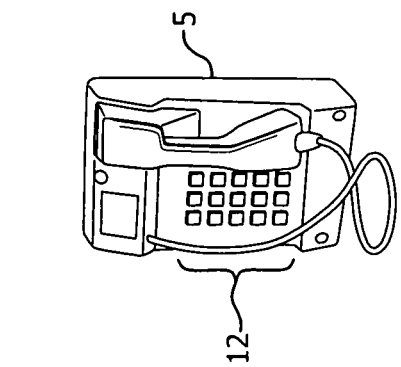
FIG. 1C
(Prior Art)
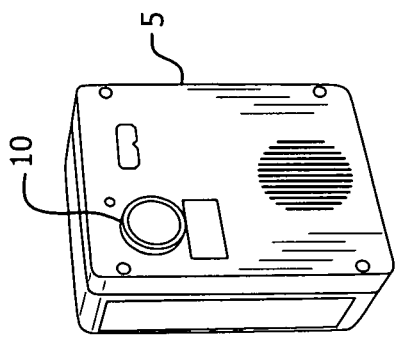
FIG. 1B
(Prior Art)
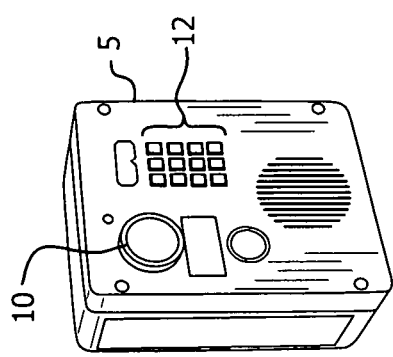
FIG. 1A
(Prior Art)
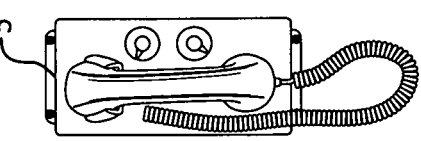
FIG. 1G
(Prior Art)
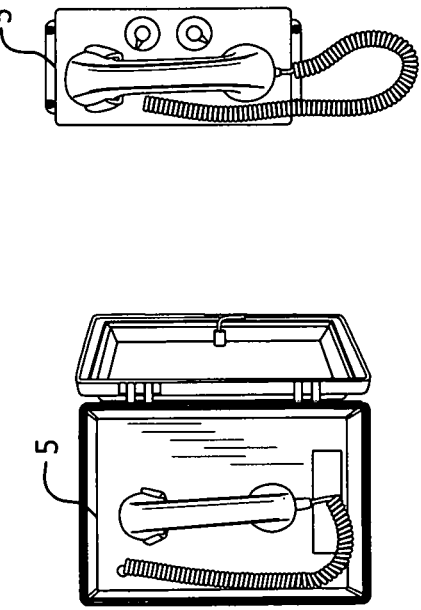
FIG. 1F
(Prior Art)
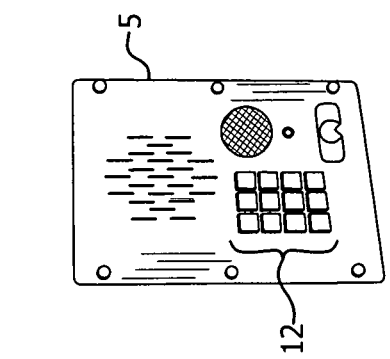
FIG. 1E
(Prior Art)
FIG. 1D
(Prior Art)

CONFIGURABLE MULTI-FUNCTION RUGGEDIZED VOICE OVER INTERNET PROTOCOL (VOIP) COMMUNICATIONS DEVICE WITH UNIVERSAL APPLICATION PLATFORM

BACKGROUND

Field

The present invention relates to an Internet Protocol or IP-based telephone unit or station configured to be pre-programmed to operate in a plurality of modes and have a touch screen display for universal form factor regardless of selected operational mode. The present invention relates also to a ruggedized IP-based telephone unit or station with touch screen display.

Description of Related Art

Robust or ruggedized communications equipment and networks are often needed in environments subject to weather extremes and possible vandalism such as a railway system or subway system. For example, a railway system can have a number of robust analog telephones installed at one or more train station(s), along passenger platforms, in service or maintenance areas, and along the railway track (i.e., trackside), and therefore generally exposed to various weather conditions and possible vandalism.

Further, robust or ruggedized communications equipment is often needed in hazardous locations. Examples of hazardous locations can be industrial sites such as land and offshore oil rigs, chemical plants, refineries, mills, and loading facilities, which can be subjected to harsh environments, as well as create potentially unsafe environments due to the presence of gases or other combustible materials. Such communications equipment often needs to be hazardous area (HA) compliant with hazardous area standards promulgated by various safety standards organizations (e.g., Underwriters Laboratories (UL)) using various classifications or certifications that regulate the design of equipment used in potentially explosive atmospheres and/or under other unsafe environmental conditions such as the use of electrical equipment in the vicinity of water, the risk of personal injury from moving or falling parts, or even the presence of biological hazards. Some example certification organizations and/or schemes for equipment used in classified hazardous locations can include, but are not limited to, the United States (National Electrical Code), Canada (Canadian Electrical Code), Europe (CENELEC EN60079-10) and throughout the world (IEC 60079-10), ATEX directives 94/9/EC and 1999/92/EC in the European Union, North America laboratories such as Intertek (ETL), Factory Mutual (FM), Canadian Standards Association (CSA) and the IECEx International Certification Scheme.

Existing communications equipment ruggedized for use in weather extremes and/or hazardous locations comprises a unit or station that is typically wall mounted and relatively simple in form factor such as a housing having a hands free configuration as illustrated in FIGS. 1A, 1B, 1D and 1E, or handset configuration as illustrated in FIGS. 1C, 1F and 1G, and having, for example, user buttons for dialing as illustrated in FIGS. 1A, 1C, 1E and 1G. Also, some telephone units or stations with handsets can have a no button configuration (e.g., FIG. 1F), that is, they can "hot dial" upon lifting the handset from a cradle with hookswitch to dial an operator (e.g., to report a condition or request assistance) or make a public address (PA) announcement.

Operators of communication networks along transit systems or at industrial locations can find a page party function to be useful, that is, the ability for multiple telephones or user stations to be involved on the same call. An approach that allows multiple telephones or user stations to be involved on the same call uses a network backbone as the communications infrastructure and Voice over Internet Protocol (VoIP) devices. With such networks, multiple channels can be utilized over a single cable. It can be possible to deploy multiple IP devices across an existing network backbone, reducing the cost of added infrastructure significantly.

GAI-Tronics Corporation in Reading, Pa., for example, manufactures both conventionally housed and ruggedized products for providing VoIP telephones, Public Address and General Alarm (PA/GA) systems and other communication system units or stations. FIG. 2 depicts an example GAI-Tronics Corporation system deploying VoIP stations 5 connected to a network switch 9 via CAT5/CAT5E cable or fiber optic cable indicated at 11, for example, and to a network backbone 7 via the network switch 9. The VoIP stations 5 can be provided with a loudspeaker 6 (e.g., an 8 ohm speaker) and powered via a local power source 8, for example. FIGS. 1A through 1G illustrate some examples of GAI-Tronics Corporation's weather-resistant and vandal-resistant outdoor stations 5 that can provide VoIP paging and/or intercom functions. As shown in FIGS. 1A through 1G, the units or stations 5 have minimal buttons (i.e., in some instances, only a "Help" or "Call" button 10 as shown in FIGS. 1B and 1D, or only a hot dial configuration as shown in FIG. 1F). While some VoIP telephone units or stations 5 have key pads 12 (e.g., FIGS. 1A, 1C, 1D), a display screen would be useful to show dialed party or incoming call party information.

Existing ruggedized VoIP products do not have a touch screen or even a liquid crystal display (LCD). Instead, existing VoIP solutions only provide VoIP functionality at desktop consoles that cannot withstand environments associated with exposed elements (e.g., railway system communications), or industrial plant environments, or classified hazardous area (HA) environments where the VoIP desktop consoles may be subjected to extreme weather conditions (e.g., precipitation, wind), extreme temperatures, vandalism, among other harsh conditions. An example conventional VoIP desktop solution for an access panel having an LCD display 14 is shown in FIG. 3. The access panel is typically programmed at a system control cabinet and its operating capabilities can include: voice paging, party line communication (e.g., with other access panels or Page/Party® stations available from GAI-Tronics Corporation, Reading, Pa.), activation/reset of emergency alarms, and a text display of the system operating status on the LCD display. The access panel speaker can also broadcast page and alarm audio. The access panel and LCD display, however, will not withstand environments associated with harsh weather conditions, harsh industrial plant environments, or classified hazardous area (HA) environments.

As illustrated in FIGS. 1A through 1G, form factors for communications devices can vary significantly, depending on whether the housing is weather-protected or HA-compliant, whether the device is hands free or uses a handset, and whether the device employs hot dialing or needs different configurations of buttons to specify zones or parties for paging or point-to-point communications or setting alarms. Thus, VoIP system designers' costs increase with each different form factor type needed to achieve a particular VoIP system function in the various environments where the VoIP systems are deployed.

SUMMARY

A need therefore exists for a VoIP telephone unit or station having a touch screen to allow for a more universal form factor to reduce manufacturing costs. That is, a need exists for a communications unit that is configurable (e.g., via programming and graphical user interface supported by a touch screen) to provide one or more of plural selected functions to avoid specialized hardware for these various applications.

Further, a need also exists for a ruggedized communications device having VoIP functionality and a touch screen user interface that can withstand environments associated with exposed elements, or industrial plant environments, or classified hazardous area (HA) environments. Ruggedized equipment developed for operating in such potentially harsh environments is expensive to manufacture since it needs to include ruggedized components and housings that can be more costly because of their robust and often superior materials and/or additional components. Thus, a need also exists for a communications unit that is configurable to provide one or more of plural selected functions to avoid specialized and often more costly hardware for these types of harsh environments.

The above and other problems are overcome, and additional advantages are realized, by illustrative embodiments.

In accordance with an illustrative embodiment, a configurable, a configurable, multi-function voice over internet protocol (VoIP) unit comprises a VoIP control module for controlling VoIP operations of the VoIP unit with respect to other VoIP units in an Internet Protocol (IP) network. The VoIP control module is configured to operate the VoIP unit in a plurality of modes by selectively participating in at least one of point-to-point communication between the VoIP unit and another one of the VoIP units in the IP network and multicast communication between the VoIP unit and a plurality of the VoIP units depending on which of the plurality of modes the VoIP unit is currently operating in. The plurality of modes comprises at least two of VoIP telephone mode, serverless page-party (SP2) station mode, access panel mode, serverless point-to-point intercom mode, party line call mode, and video call mode. The VoIP unit also comprises a speaker coupled to the VoIP control module and configured for audio output; a microphone coupled to the VoIP control module and configured to receive audio input; a touch screen display coupled to the VoIP control module and configured to operate a graphical user interface to generate display screens corresponding to the currently selected one of the plurality of modes and to receive user inputs via the display screens; and an IP network interface module connected to the VoIP control module and the IP network. The IP network interface module is configured to exchange bi-directional Ethernet data between the IP network and the VoIP control module and to condition audio signals received the IP network for output via the speaker and to condition audio signals input via the microphone for transmission via the IP network.

In accordance with an aspect of illustrative embodiments, the touch screen display comprises a panel screen made from an impact-resistant material.

In accordance with an aspect of illustrative embodiments, the touch screen display comprises a touch screen optically bonded to a liquid crystal display.

In accordance with an aspect of illustrative embodiments, the VoIP unit further comprises a ruggedized housing having the touch screen display mounted thereto on an external surface thereof and configured in accordance with Class 1, Division 2 classification in the National Fire Protection Association (NFPA) Publication 70, National Electric Code® (NEC).

In accordance with an aspect of illustrative embodiments, the VoIP unit further comprises a video camera sensor and lens. The VoIP control module is configured to send video call data from the video camera sensor and lens to at least one of the VoIP units in the IP network and to receive video call data from the at least one of the VoIP units that also comprises a video camera sensor and lens.

In accordance with an aspect of illustrative embodiments, when the VoIP unit is configured to operate in the VoIP telephone mode, the touch screen display is configured to generate at least one graphical user display screen providing at least one input button selected from the group consisting of a telephone keypad of numbered buttons to place dial-pad telephone calls, at least one button to place an auto-dialed call, a directory lookup table that allows the user to select and auto-dial a listed call recipient, a button for placing a multiple line call, and a button for call transfer. The VoIP control module is configured to establish at least one of the point-to-point communication and the multicast communication with at least one of the other VoIP units depending on activation of the at least one input button.

In accordance with an aspect of illustrative embodiments, when the VoIP unit is configured to operate in the SP2 mode, the touch screen display is configured to generate at least one graphical user display screen providing at least one input button selected from the group consisting of buttons corresponding to respective ones of a plurality of party lines, and buttons for selecting at least one paging destination, wherein the paging destination buttons are labeled with at least one of a zone number and an alphanumeric destination name. The VoIP control module is configured to establish at least one of the point-to-point communication and the multicast communication with corresponding ones of the other VoIP units depending on activation of the at least one input button.

In accordance with an aspect of illustrative embodiments, when the VoIP unit is configured to operate in the access panel mode, the touch screen display is configured to generate at least one graphical user display screen providing at least one input button selected from the group consisting of buttons corresponding to different zones to select to receive a broadcast or intercom message, buttons corresponding to respective different types of alarms, and access panel control buttons for at least one of alarm cancel, acknowledgement, mute, and type of speech. The VoIP control module is configured to establish at least one of the point-to-point communication and the multicast communication with corresponding ones of the other VoIP units depending on activation of the at least one input button.

In accordance with an aspect of illustrative embodiments, when the VoIP unit is configured to operate in the point to point intercom mode, the touch screen display is configured to generate at least one graphical user display screen providing a directory lookup table that allows the user to select and dial a listed call recipient. The VoIP control module is configured to establish the point-to-point communication with corresponding ones of the other VoIP units depending on activation of respective call recipient buttons in the directory lookup table.

In accordance with an aspect of illustrative embodiments, the VoIP control module is configured to operate the VoIP unit in a transit system communication mode selected from the group consisting of a driver communication mode for establishing calls from a driver to crew members, a crew communication mode for establishing calls from at least one of the crew members to the driver or another one of the crew members, a passenger communication mode for establishing calls from a passenger to at least one of the crew members, and a public address mode for transmitting an announcement to the other VoIP units.

In accordance with an aspect of illustrative embodiments, the VoIP unit further comprises a handset having the speaker and the microphone, and a cradle configured to operate a switch that, when the handset is removed from the cradle, generates a signal to the VoIP control module to initiate at least one of a page and a party call to at least one of the VoIP units operated by a crew member, when the VoIP unit is configured to operate in the driver communication mode.

In accordance with an aspect of illustrative embodiments, the touch screen display is configured to generate at least one graphical user display screen providing a selection button to initiate a call to at least one of the VoIP units operated by a crew member and, in response to activation of the selection button, when the VoIP unit is configured to operate in the driver communication mode.

In accordance with an aspect of illustrative embodiments, when the VoIP control module is configured to operate in the transit system communication mode, the VoIP control module operates via the SP2 station mode to connect VoIP units operated by respective ones of the driver and crew members by distributing a system configuration among the VoIP unit and the other VoIP units that designates IP addresses to respective ones of the VoIP unit and the other VoIP units and designates multicast addresses of page and party line sockets employed by the VoIP unit with respect to the other VoIP units to participate in party calls between the driver and crew members and to provide page announcements via the VoIP units. For example, when the VoIP unit is configured in accordance with the SP2 station mode, the VoIP control unit is configured to be self-aware of other VoIP units by using a common channel to send or receive the system configuration.

In accordance with an aspect of illustrative embodiments, when the VoIP unit is configured to operate in the crew communication mode, the touch screen display is configured to generate at least one graphical user display screen providing at least one input button selected from the group consisting of a driver call button, a crew member call button, at least one page zone button, and a page all zones button. The VoIP control module is configured to establish at least one of the point-to-point communication and the multicast communication with corresponding ones of the other VoIP units depending on activation of the at least one input button.

In accordance with an aspect of illustrative embodiments, when the VoIP unit is configured to operate in the crew communication mode, the touch screen display is configured to generate at least one indicator indicating that the VoIP unit has a connection to the IP network, and when an incoming call is being received from at least one of the driver, another crew member, a call for aid button activated on one of the VoIP units, and a page established on one of the VoIP units.

In accordance with an aspect of illustrative embodiments, when the VoIP unit is configured to operate in a driver communication mode, the touch screen display is configured to generate at least one graphical user display screen indicating that the VoIP unit has established a driver call to the VoIP units being operated by crew members, and to generate at least one indicator indicating that the VoIP unit has an incoming call from one of the VoIP units being operated by a crew member and at least one input screen area to activate to answer the incoming call during the driver call.

In accordance with an aspect of illustrative embodiments, when the VoIP unit is configured to operate in the driver communication mode, the touch screen display is configured to generate at least one indicator selected from the group consisting of an indicator indicating that the VoIP unit has a connection to the IP network, and an indicator indicating that an incoming call is being received from one of the VoIP units being operated by a crew member.

In accordance with an aspect of illustrative embodiments, when the VoIP unit is configured to operate in the public address mode, the touch screen display is configured to generate at least one graphical user display screen indicating when a page address is being generated.

In accordance with an aspect of illustrative embodiments, when the VoIP unit is configured to operate in the crew communication mode, the touch screen display is configured to generate at least one indicator indicating that the VoIP unit has a connection to the IP network, and that an incoming call is being received from at least one of the driver, another crew member, a call for aid button activated on one of the VoIP units, and a page established on one of the VoIP units.

In accordance with an aspect of illustrative embodiments, when the VoIP unit is configured to operate in the passenger communication mode, the touch screen display is configured to generate at least one graphical user display screen indicating at least one of an advertisement, and an exit sign having at least one of alphanumeric characters and directional arrows relating to an exit from the transit system.

In accordance with an aspect of illustrative embodiments, when the VoIP unit is connected to a wireless communication access point, the touch screen display is configured to display information received via internet.

Additional and/or other aspects and advantages of the present invention will be set forth in the description that follows, or will be apparent from the description, or may be learned by practice of the invention. The present invention may comprise VoIP telephone units and systems and methods for operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The above and/or other aspects and advantages of illustrative embodiments of the invention will be more readily appreciated from the following detailed description, taken in conjunction with the accompanying drawings, of which:

FIGS. 1A, 1B, 1C, 1D, 1E, 1F and 1G depict conventional form factors for VoIP telephone units.

Throughout the drawing figures, like reference numbers will be understood to refer to like elements, features and structures.

DETAILED DESCRIPTION OF ILLUSTRATIVE EMBODIMENTS

Figure 2:
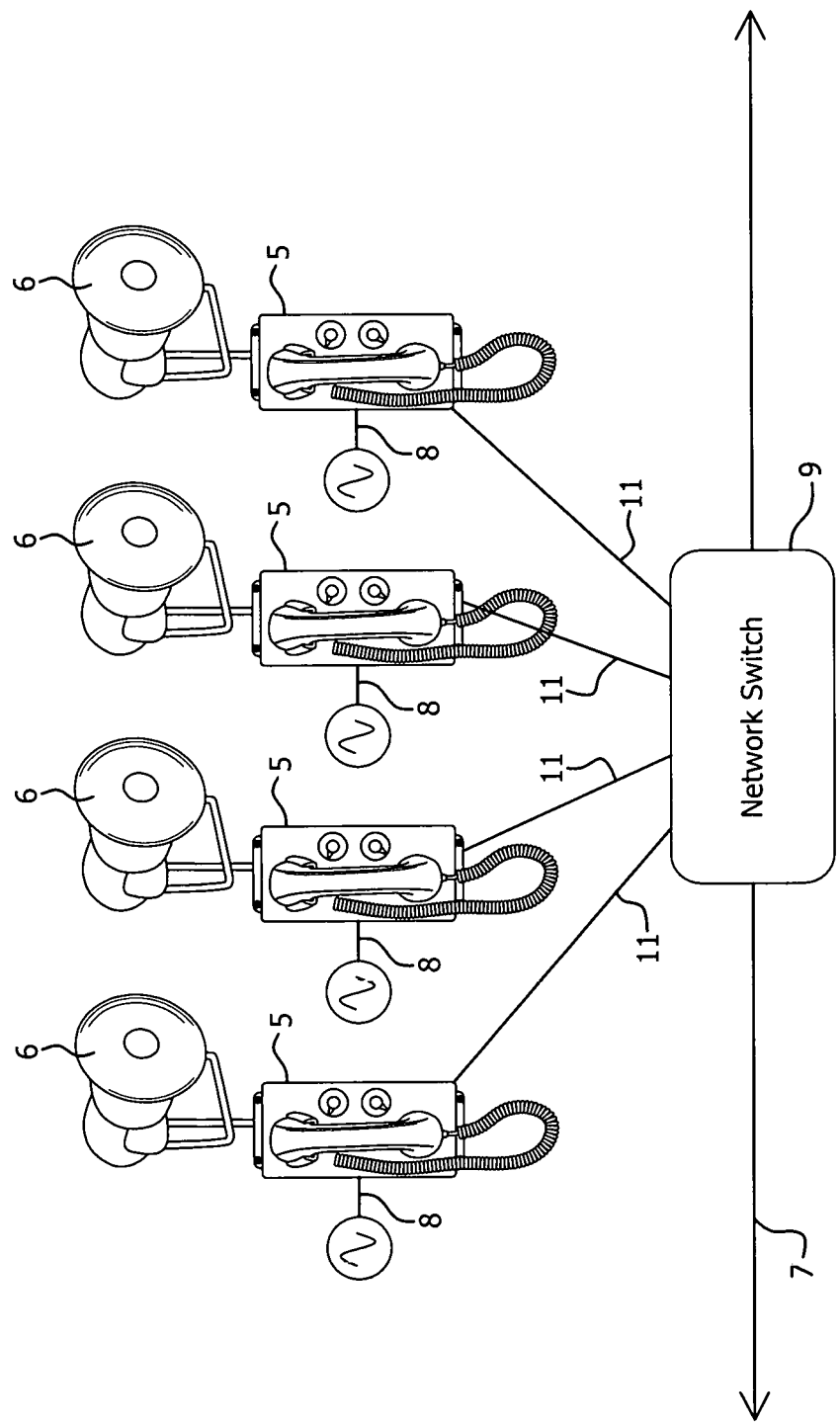
FIG. 2 depicts conventional VoIP system.
Figure 3:
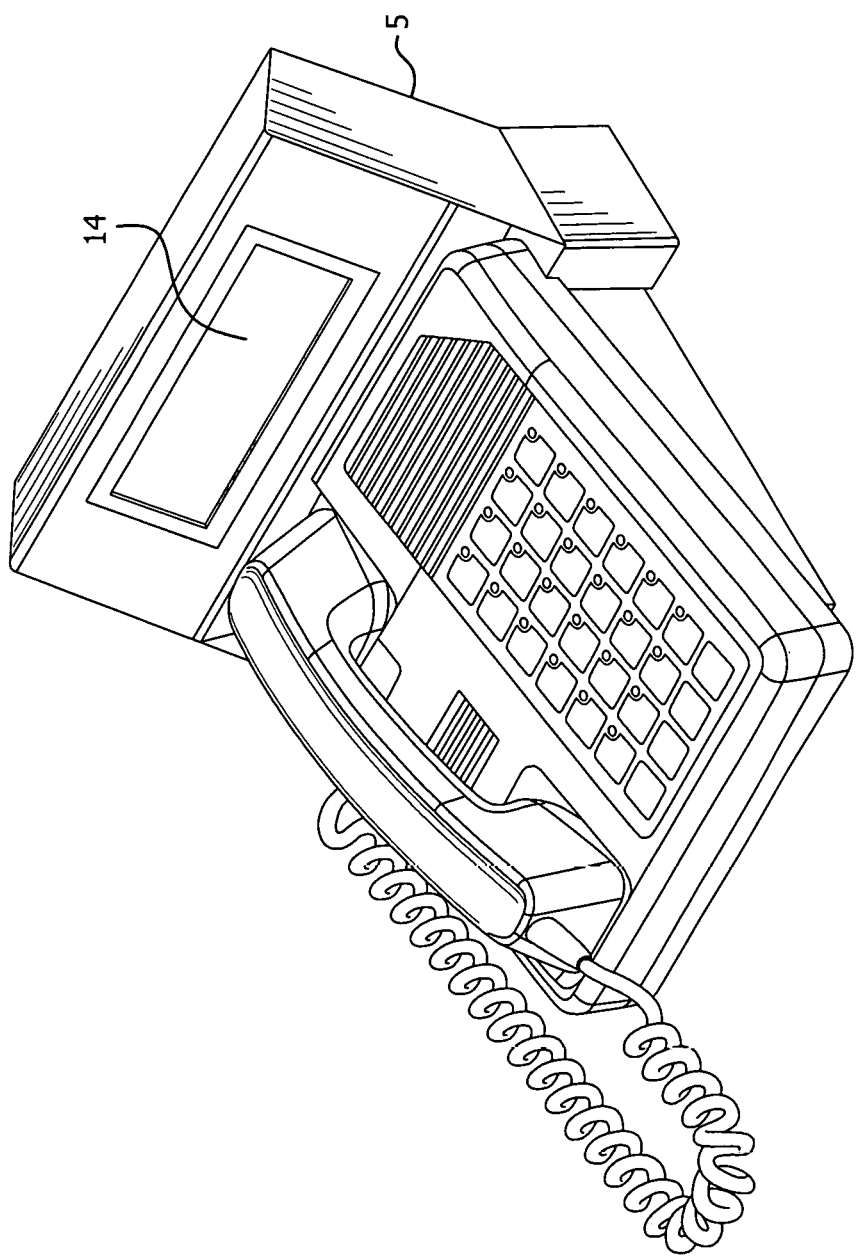
FIG. 3 depicts a conventional desktop VoIP device with LCD.

Reference will now be made in detail to embodiments of the present invention, which are illustrated in the accompanying drawings. The embodiments described herein exemplify, but do not limit, the present invention by referring to the drawings.

Overview

As will be described in connection with FIGS. 4 through 12, embodiments of the present invention advantageously provide a configurable, multi-function IP-based communication unit 16 with touch screen display, common or universal hardware set form factor, and universal application platform (UAP) 98 (FIG. 5), which can be configured for use in any of a plurality of operational modes, and can be ruggedized for use in harsh environments. The universal hardware set form factor enables the IP-based communication product to be optimized for commercial use, that is, easily adapted for different applications and environments using a minimal number of housing configurations or features (e.g., tactile buttons or dials).

Figure 4:
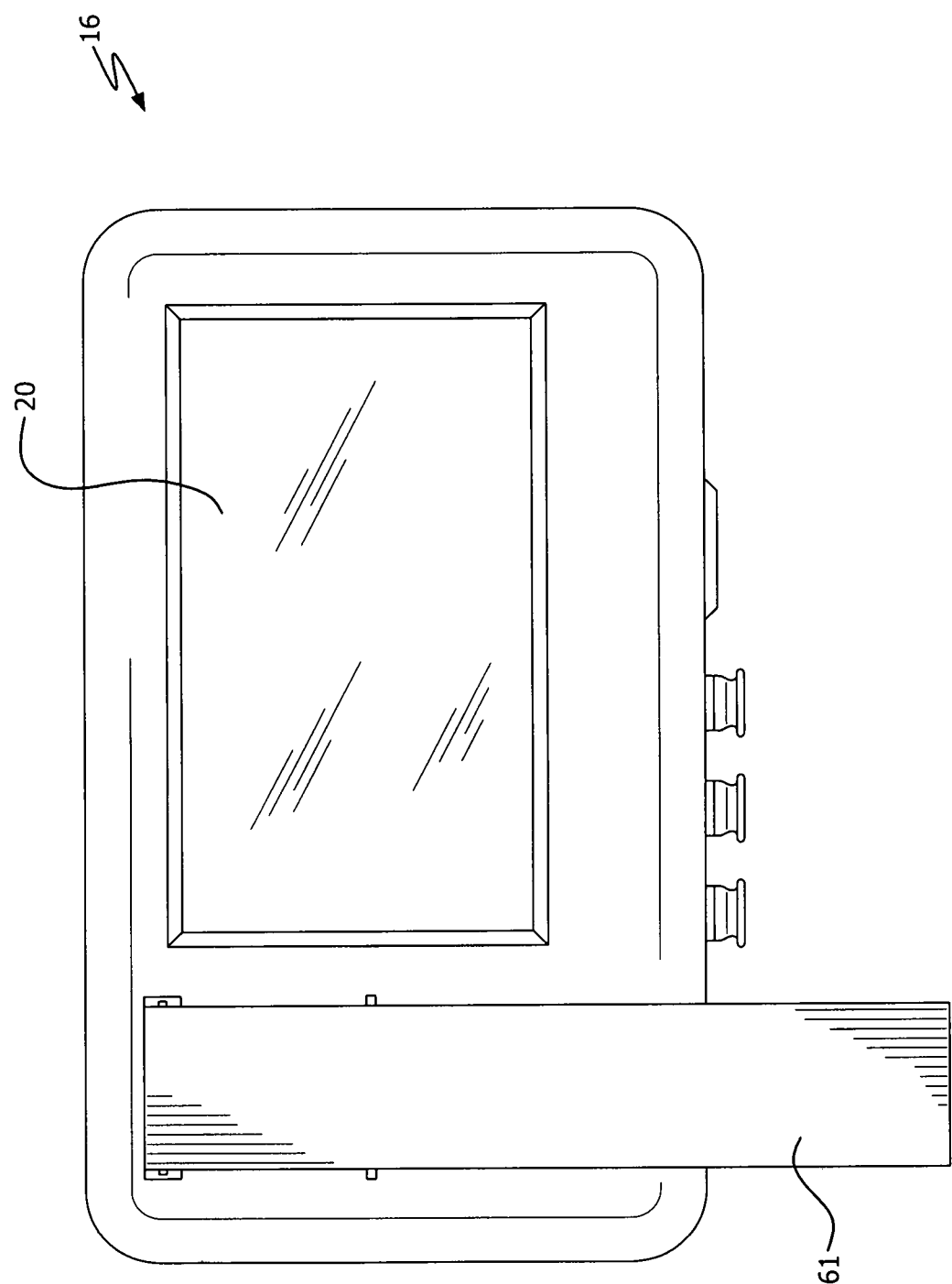
FIG. 4 illustrates an IP-based telecommunications unit with touch screen display constructed in accordance with an illustrative embodiment.
Figure 5:
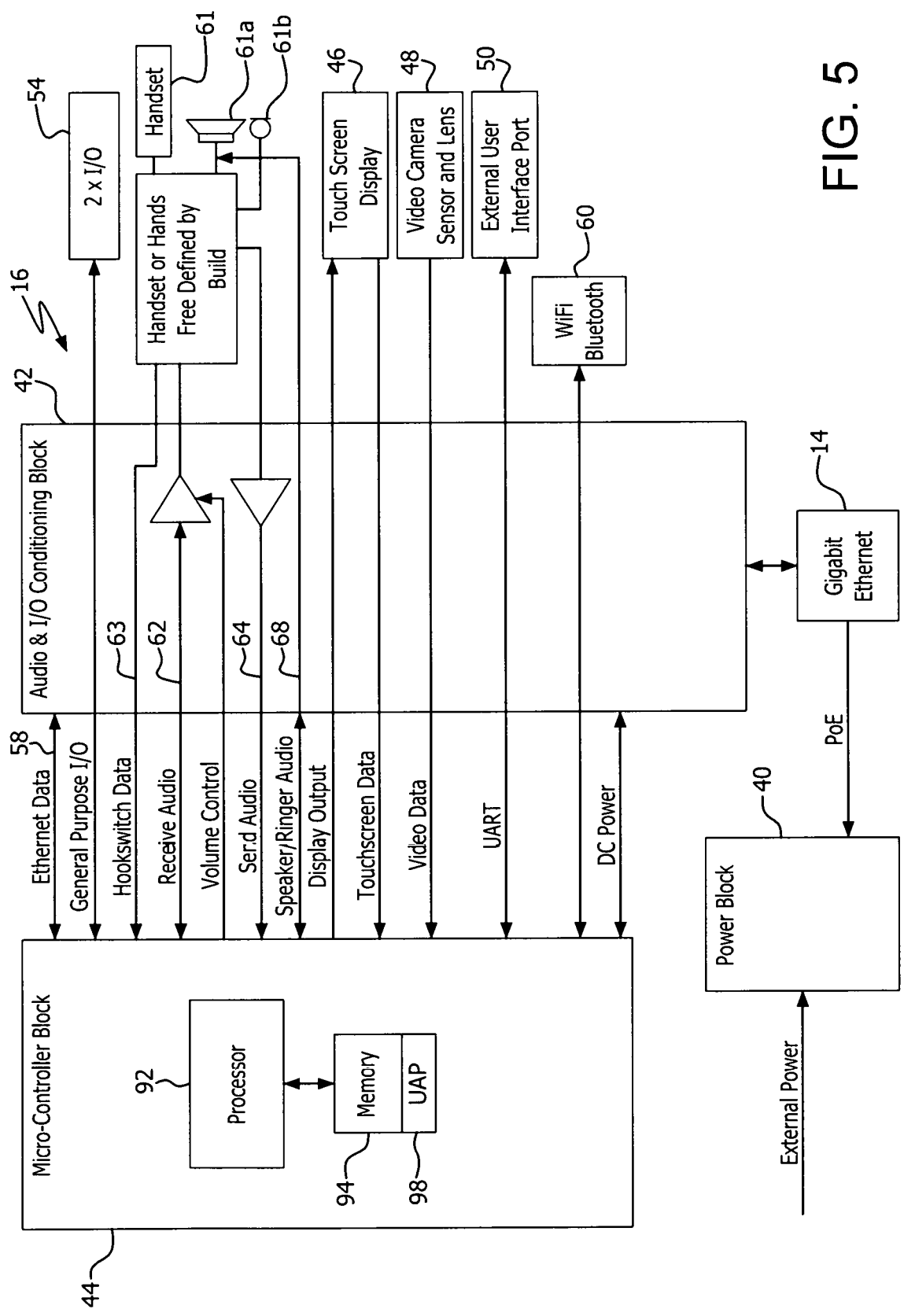
FIG. 5 is a block diagram of components of an IP-based telecommunications unit in accordance with an illustrative embodiment.

For example, with reference to FIGS. 4 and 5, the IP-based product or unit 16 is designed to operate as a multi-function device over Ethernet that is configurable to operate in any of a plurality of operational modes. The operational modes can include, but are not limited to, VoIP telephone, video streaming for video calls, intercom, alarm activation for a central public address/general alarm (PA/GA) system, a "serverless" page-party (SP2) system, voice product with flash memory, product with conference function, and so on, for example, all by utilizing graphical user interface (GUI) screens 20 on a touch screen display 46 that are designed specifically for each operational mode. In other words, the IP-based product or unit 16 has a common hardware set of components as exemplified in FIG. 5 wherein each of the operational modes is programmed (e.g., providing software instructions stored in a memory structure 94 of the control module 44 for a universal application platform 98) or otherwise configured into the unit 16 and implemented using GUI screens 20 developed for that operational mode and generated on the touch screen display 46. These operational modes and related GUI screens 20 can be considered a multi-function device transformer since they essentially transform the IP-based unit 16 into a particular type of VoIP-based station or product, while allowing for minimal changes to the housing hardware apart from deciding whether the IP-based unit 16 is hands free (FIG. 7) or has a handset 61 (FIG. 6) and the degree of ruggedness of the housing (e.g., HA-compliant, vandal-resistant or merely weather-resistant, or configured only for indoor use in non-HA environments). The ability to perform each of these functions or operational modes in one unit 16 utilizing a dynamic user interface 20 not only eases installation of such units 16, which can include the hazardous and extreme environments, but also reduces the actual number of different products the end-customer must acquire to achieve all or some of these functions in a communications system installation and also simplifies purchase and inventory of any replacement units for an installed system.

With reference to FIG. 5, a VoIP telephone unit 16 can be provided, for example, with a control block or module 44, a signal conditioning block or module 42, a power block or module 40 and a handset 61 or hands free microphone 61b and speaker 61a. The control module 44 is described in more detail below. The signal conditioning module 42 is connected to an Ethernet network wirelessly or using fiber optic cable or copper, for example, via an Ethernet interface 14. The unit 16 is provided with a touch screen display 46, optional LEDs 84 (not shown), and an optional video camera sensor and lens 48, and an external user interface port 50. The unit 16 can have a power block or module 40 to receive power via Power over the Ethernet (PoE) or POE Plus, although other power sources can be used such as an external power source. A wireless communication interface (e.g., IEEE 802.11, WiFi, Bluetooth™ or other protocol) 60 can be provided to allow wireless communication between the unit 16 and another device such as a smart phone, sensor, Internet of Things (IoT) device, and so on.

The touch screen display 46 can be ruggedized, that is, it can consist of an impact-resistant screen or screen layer, for example, whereby the glass is laminated or bonding is used to prevent glass breakage from breaking any seal deployed inside the unit 16 for HA-compliance reasons. In accordance with one illustrative embodiment, the touch screen display 46 can be an automobile-grade liquid crystal display (LCD) screen (e.g., a 7" display) capable of withstanding a considerable range of temperatures (e.g., –30° C. to 70° C.), and having optional full sun and/or wide view visibility, that is expected in the automobile environment. Further, the display 46 is mounted in a housing of a unit 16 to withstand vandalism and weather and, as needed, to comply with HA classification requirements. Further, in accordance with an illustrative embodiment, the touch screen of the touch screen display 46 is optically bonded to a liquid crystal display (LCD) to remove an air gap that can occur between a touch screen and an LCD in many applications when, for example, the touch screen is adhered to an LCD by its edges. As such, the unit 16 is not susceptible to moisture that can accumulate in an LCD air gap due to certain external conditions, making the unit 16 more weather-persistent than display devices having an air gap.

The unit 16 is provided with a magnetic hook switch sensor (e.g., coupled to the handset 61's cradle, not shown), the output 63 of which can be coupled to the signal conditioning block or module 42 for providing on-hook/off-hook status data of the handset 61 to the control module 44. As stated above, the signal conditioning module 42 is configured to provide public address (PA) speaker audio 68, as well as earpiece/speaker audio 62 from the control module 44 for the handset 61 or hands free speaker 61a and receive microphone audio 64 from the handset 61 or separate microphone 61b for the control module 44. The signal conditioning module 42 is also configured to provide input data from the touch screen 46 and DC power to the VoIP control board 44. General Purpose Monitored Inputs/Outputs (I/O) are provided as generally indicated at 54.

The signal conditioning module 42 and the control module 44 are configured to process Ethernet data 58. The control module 44 in a unit 16 comprises a programmable processor 92 and integral or separate memory 94. As stated above, the microprocessor 92 can be, for example, a digital signal processor (DSP) or system on chip (SOC) with standard VoIP/SIP software. The control module 44 can employ, for example, an audio CODEC (e.g., 8 kHz G711A/U Law) to provide full duplex hands free speech; that is, when in a call, the units 16's audio will be full duplex (i.e., transmit and receive simultaneously with no switching).

In accordance with illustrative aspects of the present invention, the units 16 are programmed (e.g., via software code instructions executed by their respective processors 92 and, for example, in accordance with a universal application platform 98) to establish and terminate point-to-point calls and participate in party line calls, among other operations in accordance with each of the plurality of operational modes. As stated above and in accordance with an embodiment, the VoIP telephone unit 16 is a configurable multi-function device with universal application platform 98 that is preprogrammed to operate in any of a plurality of modes of operation. The plurality of operational modes can be, but are not limited to, two of more of the following modes: a VoIP telephone mode, a serverless page-party station mode, an access panel mode, a serverless point-to-point intercom mode, a party line call mode, and a video call mode, and so on. In accordance with another embodiment of a universal application platform 98 and described with reference to FIGS. 14 through 22, the units 16 are configured to operate as different transit system communication units 16 for different types of users in a transit system such as train car drivers, crew members, passengers and for different locations (e.g., on-board train communications units, trackside units and transit station or platform units), and can also optionally operate in an advertisement or other signage mode (e.g., EXIT signage, advertisement, schedule or other information). It is to be understood, however, that a transit system communication unit 15 can be implemented to perform one or more of these operational modes but also using dedicated input buttons and indicators instead of a GUI 20 on a touch screen display 46, in accordance with another illustrative embodiment described in connection with FIG. 13. Some example operational modes and with their respective basic operations with now be described.

Serverless Page/Party (SP2)

Figure 6:
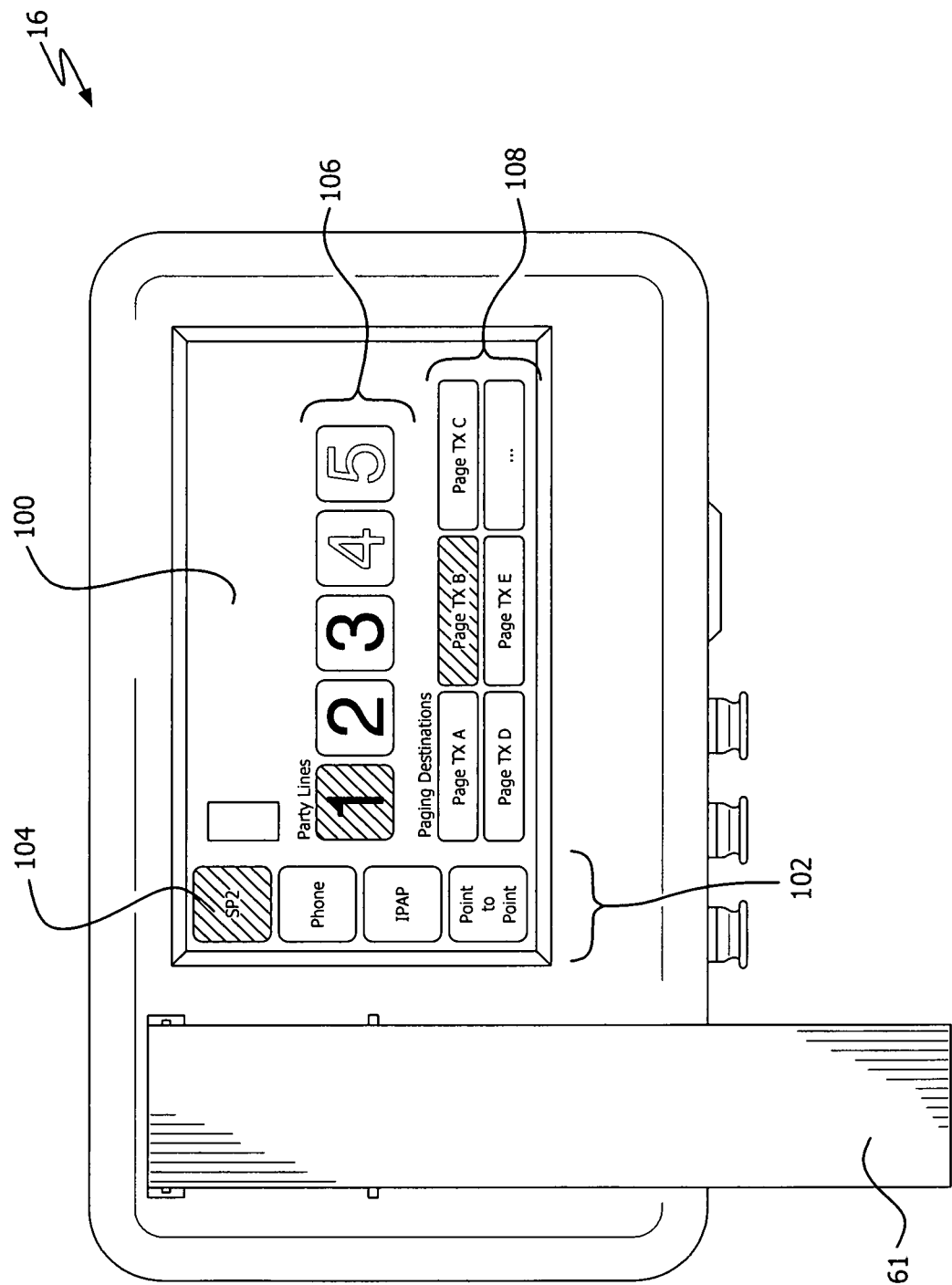
FIGS. 6, 7, 8, 9, 10, 11 and 12 depict the IP-based telecommunications unit in FIG. 4 in various pre-programmed operational modes implemented using a universal application platform and a universal form factor of a touch screen display and associated components in accordance with illustrative embodiments.
Figure 7:
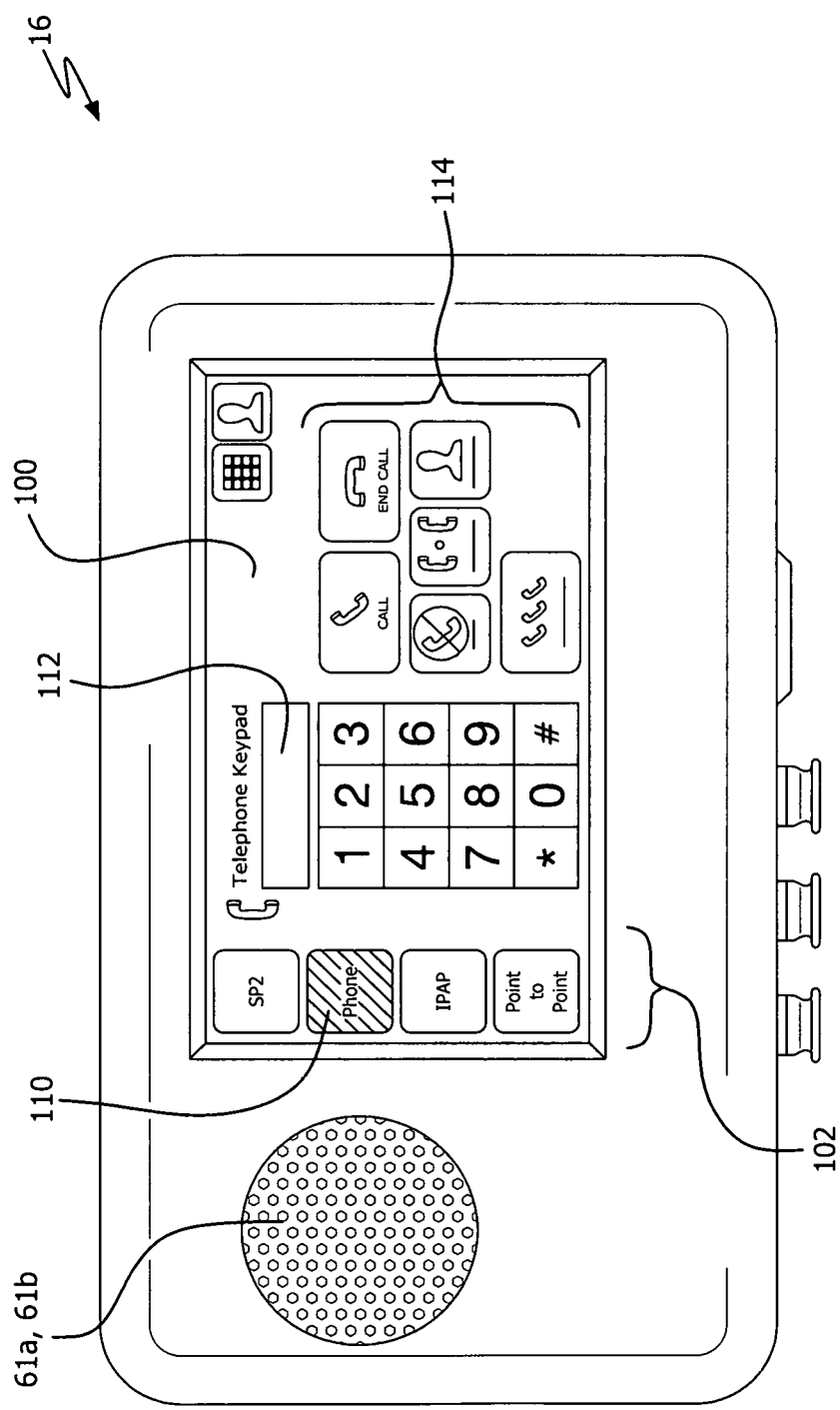

With reference to FIG. 6, the IP-based unit 16 is configured in a housing with a handset 61, but could also be hands free with a speaker/microphone as indicated at 61a and 61b in FIG. 7. The GUI screen 100 in FIG. 6 shows operational mode selection buttons 102 with the SP2 mode button 104 selected on an SP2 mode screen. The SP2 mode screen 100 in FIG. 6 includes party line buttons 106 (e.g., five buttons although a different number of party line buttons can be provided) and paging destinations indicated at 108. In the SP2 mode of operation, the unit 16 provides the functionality of the SP2 stations with hardwired user inputs (e.g., buttons, dials, switches) currently available from GAI-Tronics Corporation in Reading, Pa., and described in commonly-owned WO 2016/100795 incorporated by reference herein. For example, when an IP-based unit 16 is operated per the UAP 98 to be a serverless page party (SP2) unit with regard to connections to other page party units 16 in a network, the page party units 16 can be configured to be self-aware of each other, via a mutual provisioning mode distribution of a system configuration to these page party units 16 that designates unit IP addresses for point-to-point calls as well as multicast addresses of page and party line sockets, thereby eliminating the need for employing a SIP server or IP-PBX to connect to each other. For example, in a mutual provisioning mode, a common channel can be used by all VoIP units 16 in a system and at least one of the units 16 in the system is designated as a master unit to send the system configuration to the other units 16 via the common channel following their initializations. Since the need for a conference bridge and the additional time needed to set up a conference in older systems is obviated by units 16 configured in this manner, the units 16 are also advantageous because multicast is instantaneously available on a party line, making the page party unit 16 essentially real-time operational.

In addition to providing the functions of the SP2 stations with hard-wired user input buttons currently available from GAI-Tronics Corporation, the unit 16 also provides several enhancements in the SP2 mode of operation. These enhancements include, but are not limited to, for example, the ability to access more than the current maximum of five party lines indicated at 106. Instead of party lines being numbered 1 through 5 via a hardwired dial, they can now be named using GUI screens on the touch screen display 46. In addition, the unit 16 can indicate on the GUI screens those party lines that are currently in use by others to allow quick party-line selection. The example illustrated unit 16 has the ability to transmit to 5 page zones that are numbered 1 through 5. With the enhancements of GUI screens on a touch screen display 46, zones can be also named (e.g., alphanumerically and/or using GUI symbols). The display 46 can indicate which zones have activity and which zone is currently being broadcast through the unit 16's amplifier and speaker 61.

SP2, as described in WO 2016/100795, is a paging and intercom system that combines the simplicity of "press to page, release to party" operation with multicast Voice over Internet Protocol (VoIP) technology to provide virtually instant communication in the most demanding of environments. SP2 is wired to the nearest network switch using CAT5/CAT5E Ethernet cable or Fiber Optic Cable, for example, or wirelessly connected. Local power is supplied to each station either as a separate power cable or contained in a hybrid power/network cable or via a power supply (e.g., a rail specified power supply unit for IP-based units 16 deployed in train cars or vehicles in other types of transit systems). SP2 is a "serverless" system. While other paging systems rely on servers to route calls and administrate the system, SP2 uses multicast technology, bypassing the need for servers and resulting in a number of benefits. For example, the SP2 is fast. Since no server is needed to set up call routing and conference bridges, SP2 can provide immediate one way paging and full-duplex "party line" communication via VoIP multicast technology using code executed by the microprocessor 92 in the control module 44. Also, since SP2 is a serverless system, it can easily be integrated into an existing IP network. This can significantly reduce the installation cost of SP2 and simplify plant data architecture. SP2 is simple since there is no keypad required and no extensions to memorize. The user simply lifts the handset, selects a paging zone, squeezes the handset pressbar, and makes an announcement over system speakers. The user can release the pressbar and talk on one of the five available party lines. Units 16 operating in SP2 mode can be supplied with a handset 61 for paging and intercom as illustrated in FIG. 6, or without a handset for where only paging coverage (e.g., a speaker 61a) is needed, for example.

VoIP Telephone

Figure 8:
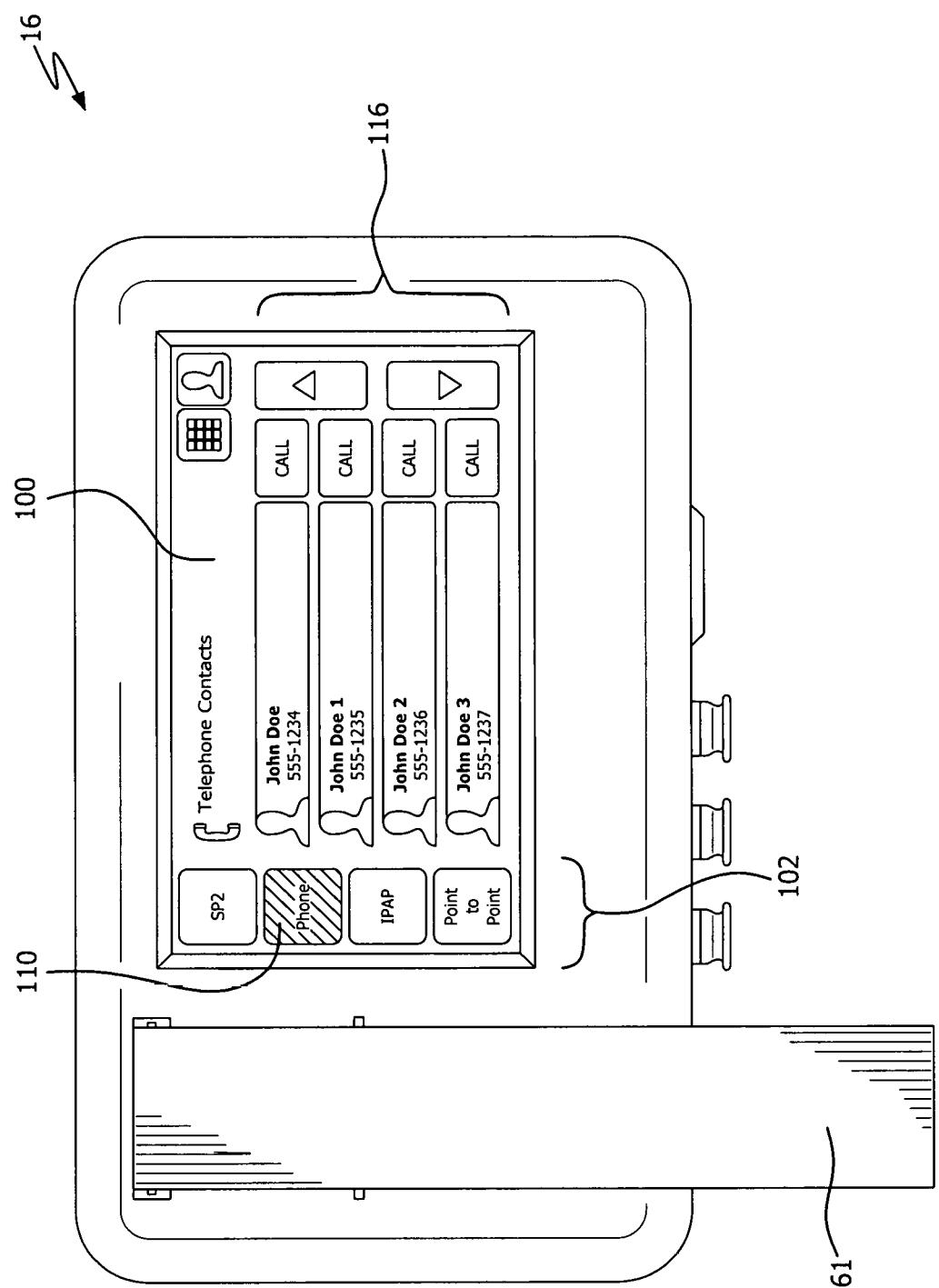

With reference to FIGS. 7 and 8, the IP-based unit 16 can be configured in a housing with a handset 61 in FIG. 8, and hands free with a speaker/microphone as indicated at 61a and 61b in FIG. 7. The GUI screens 100 in FIGS. 7 and 8 each show operational mode selection buttons 102 with the Phone mode button 110 selected and highlighted. When operated as a VoIP telephone in the Phone operational mode, the IP-based unit 16 determines that a SIP server/IP PBX is available and undergoes registration. Some example operations of a VoIP telephone are described in commonly owned WO/2015/031624 which is incorporated by reference herein. For example, the IP-based unit 16 is configured (e.g., via software code executed by the microprocessor 92 in the control module 44 (FIG. 5)) with a dedicated SIP address. With its IP connectivity and loudspeaker 61a, the unit 16 can enable point-to-point calling and have a "ring" tone generated to the loudspeaker, for example, for point-to-point calls to its dedicated SIP address.

The unit 16 in this mode of operation provides the ability for the user to make SIP-based IP telephone calls in hands free or handset mode, depending on how the unit is built 16. For example, the GUI screen can be programmed and configured to display a telephone keypad 112 for dialing. In addition to making dial-pad calls, the touch screen display 46 feature of the unit 16 allows for quick-dials, auto-dials and directory lookup by the user (e.g., as indicated at 116 in FIG. 8) and provides buttons as necessary for multiple lines, call transfer, and so on as indicated at 114 in FIG. 7. Finally, the unit 16 can be configured with an optional camera 48 and then stream the image of the person calling to a receiver unit 16. If both units are camera-capable, the call can be a video call if the units 16 are so configured.

Access Panel

Figure 9:
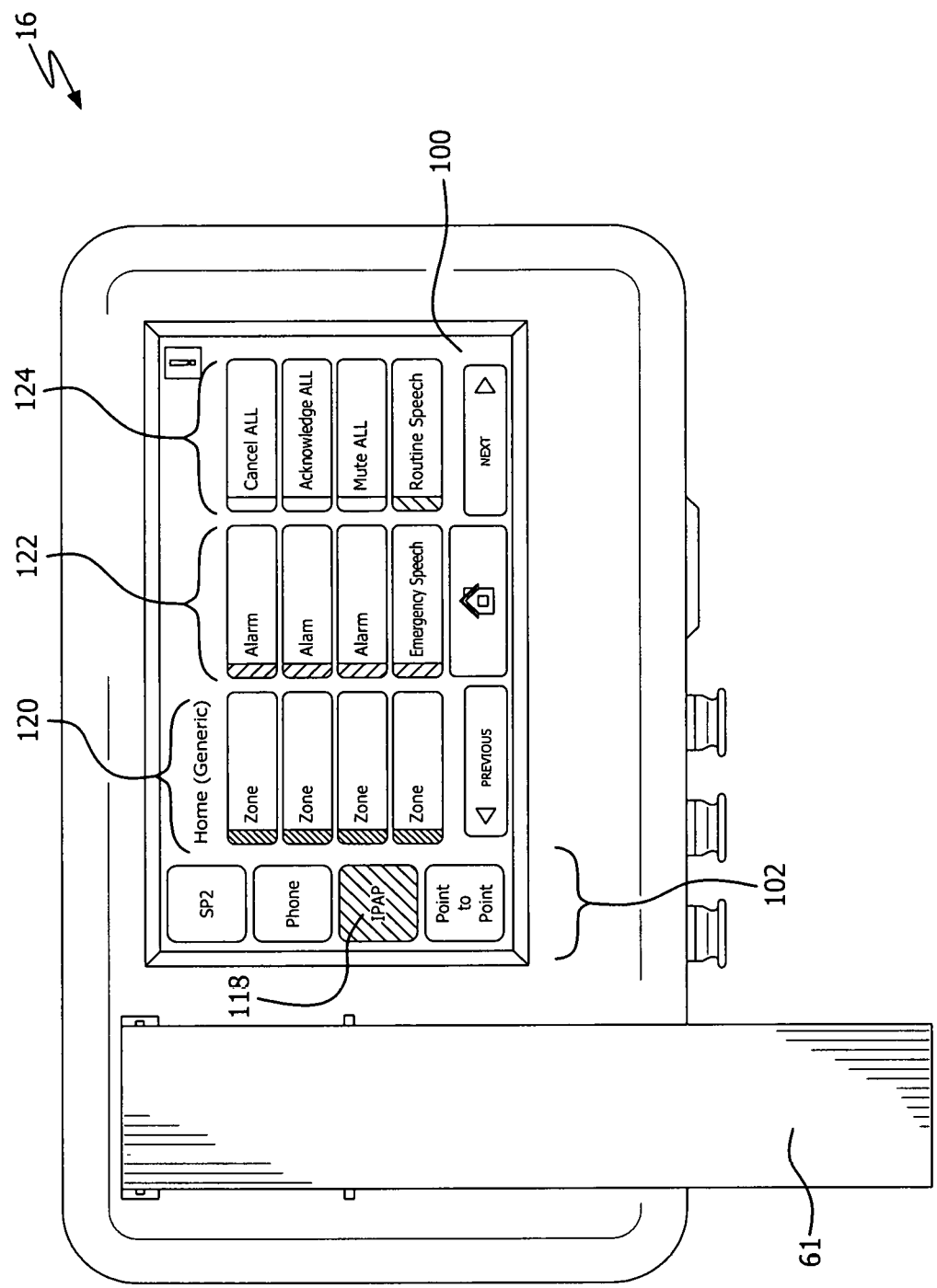

Currently, GAI-Tronics Corporation makes access panels that are desktop or rackmount in design. These access panels allow the user to activate alarms or broadcast live voice utilizing the central PA/GA controller. There is, however, a need to be able activate alarms or broadcast voice from field VoIP units that are near various areas where users are located, rather than requiring a user in a central control room to do so. In access panel mode of the IP-based unit 16, the user can simply activate preprogrammed alarms, select zones and broadcast specific alarms or broadcast live voice. Broadcasts are routed to selected zones using VoIP technology described above. With reference to FIG. 9, the IP-based unit 16 is configured in a housing with a handset 61, but could also be hands free with a speaker/microphone as indicated at 61a and 61b in FIG. 7. The GUI screen 100 in FIG. 9 shows operational mode selection buttons 102 with the IPAP (Internet Protocol Access Panel) mode button 118 selected in an access panel mode screen having zone selection buttons 120 for sending announcements to selected zones, alarm buttons 122, and access panel function buttons 124 such as a Cancel ALL button, an Acknowledge ALL button, a Mute ALL button and an Emergency Speech and Routine Speech buttons. These access panel operations and functions initiated by activation of respective buttons are performed, for example, in accordance with software code executed by the microprocessor 92 in the control module 44 (FIG. 5).

Point-to-Point Intercom (Serverless)

Figure 10:
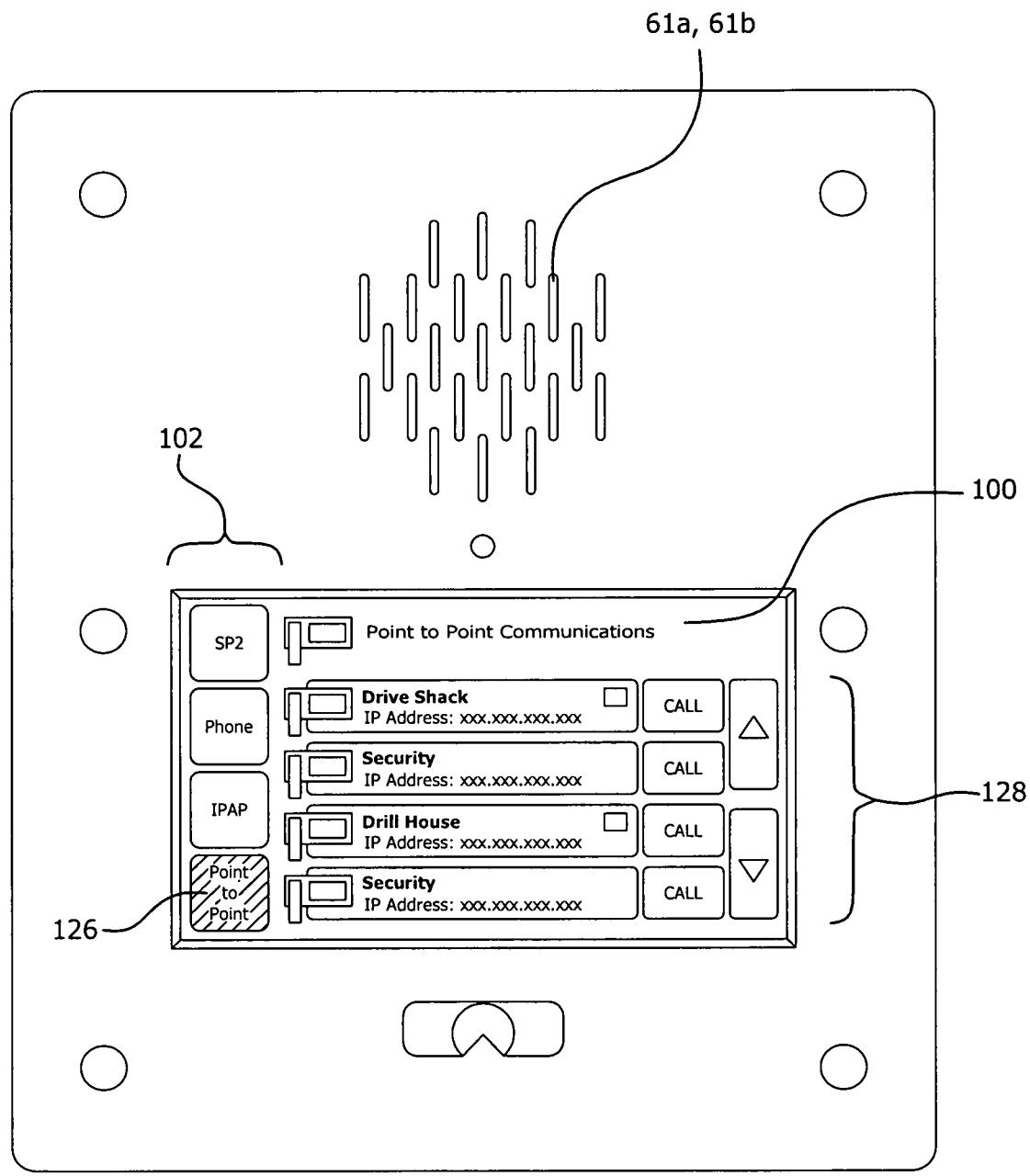
Figure 11:
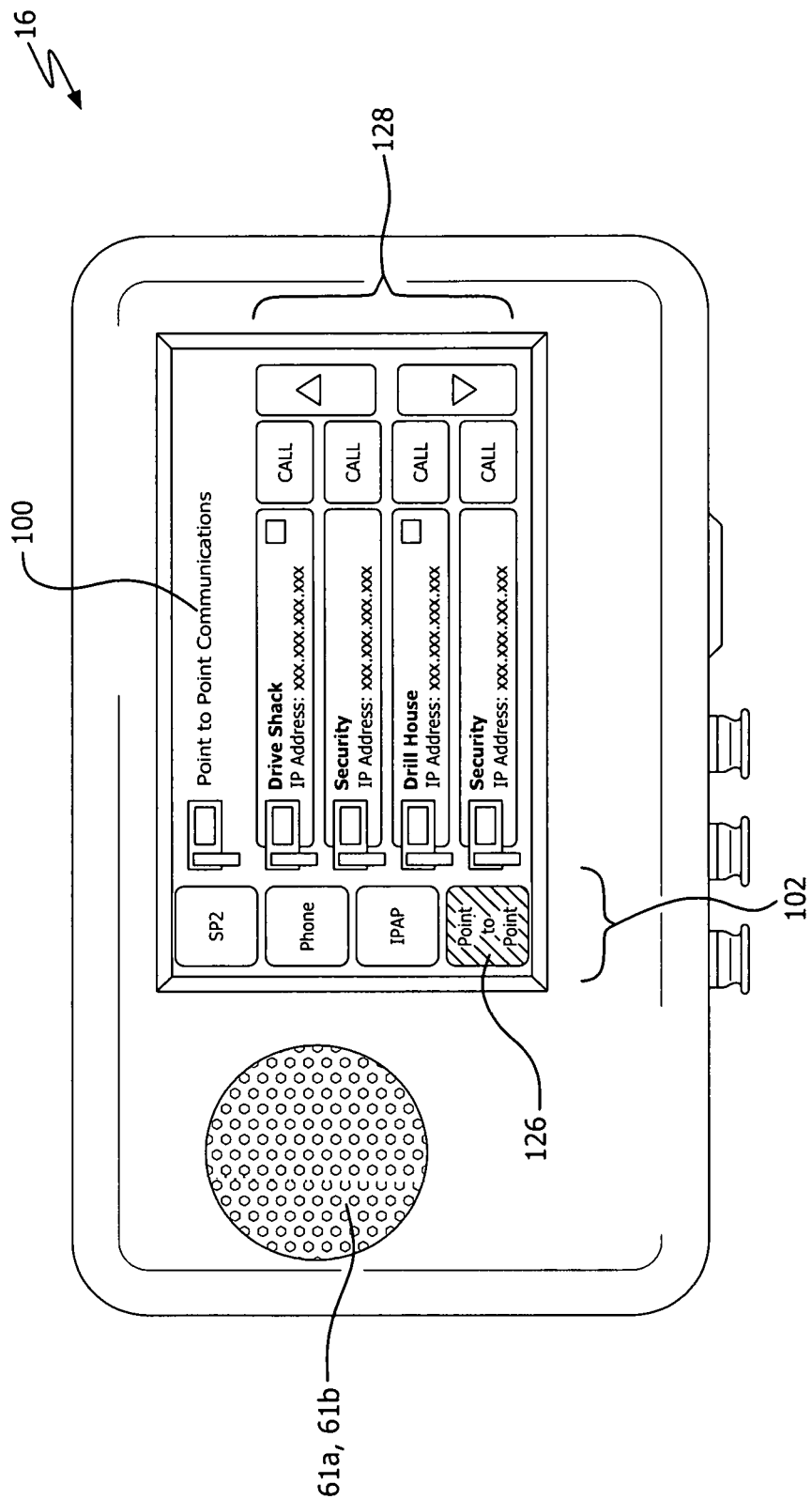
Figure 12:
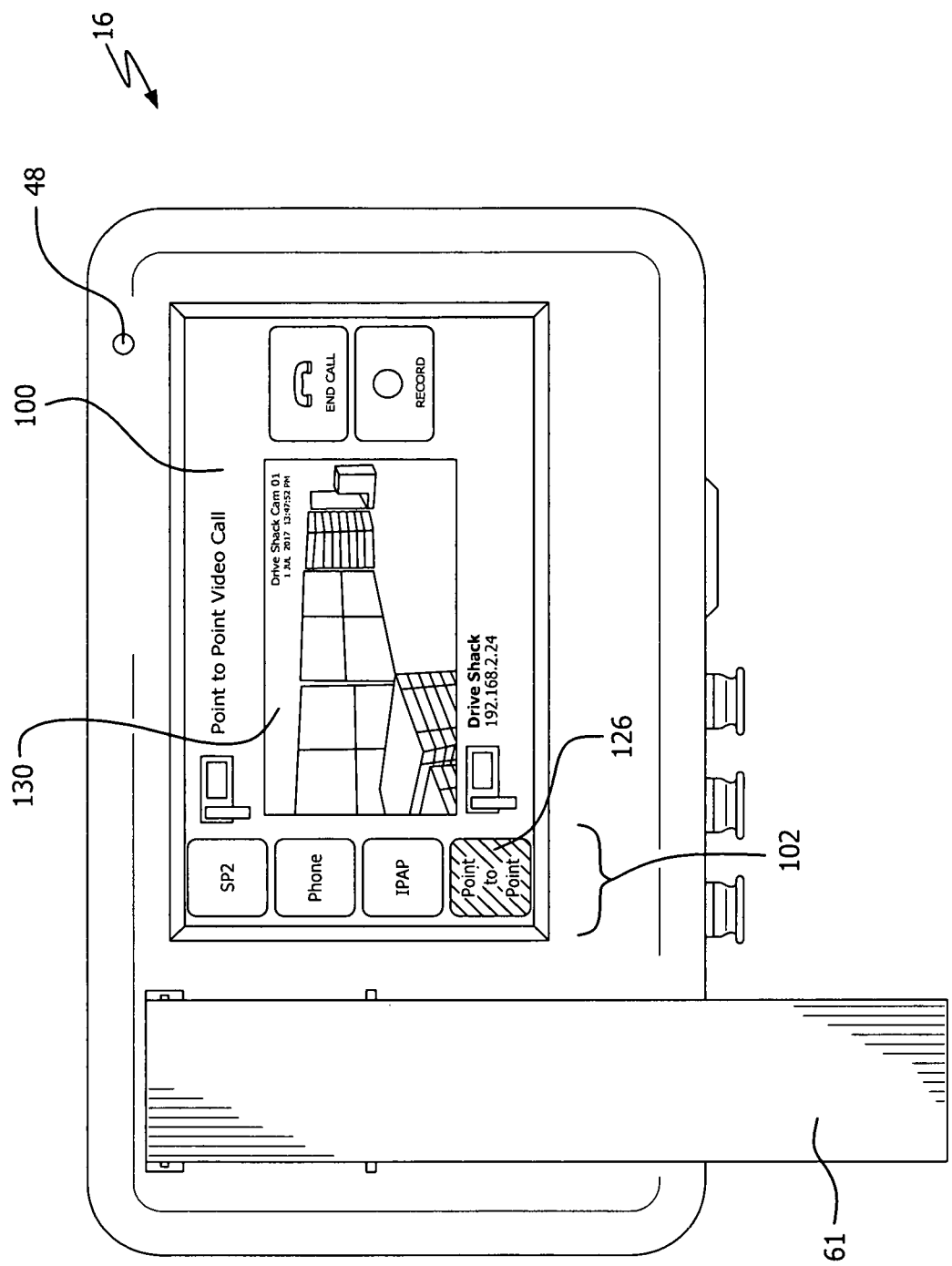

Similar to a VoIP telephone, when an IP unit 16 is operated as a point-to-point intercom, it allows a user to contact another individual on the system via a number. The GUI screen 100 in each of FIGS. 10 and 11 shows operational mode selection buttons 102 with the Point-to-Point mode button 126 selected in a Point-to-Point intercom mode screen. Individual's numbers are provided as respective buttons indicated at 128 which can be scrolled through via the screen 100 on the touch screen display 46. Some point-to-point intercom products require specifically configured end-points to be connected to a central server. The unit 16 with enhanced point-to-point intercom operation, however, can be configured to mimic existing point-to-point intercom devices by providing a keypad if so desired, but also does not require using a central server since SP2 operations and configuration as described above allow for serverless point-to-point operation. In addition, with touch screen display 46 operation, specific names indicated generally at 128 such as "Lobby" or "Warehouse" can be used instead of numbers to call a specific person. When a call is made, the unit 16 simply rings a VoIP phone of another user upon selection of one of the buttons 128, and the other user will lift the handset or activate hands free mode to communicate. FIGS. 10 and 11 illustrates examples of different enclosures for the IP unit 16 having no handset 61. If both units 16 are camera-capable, the call can be a video call if the units 16 are so configured, as illustrated in FIG. 12. These point-to-point intercom operations and functions initiated by activation of respective buttons are performed, for example, in accordance with software code executed by the microprocessor 92 in the control module 44 (FIG. 5).

Transmit System Communications

Figure 13:
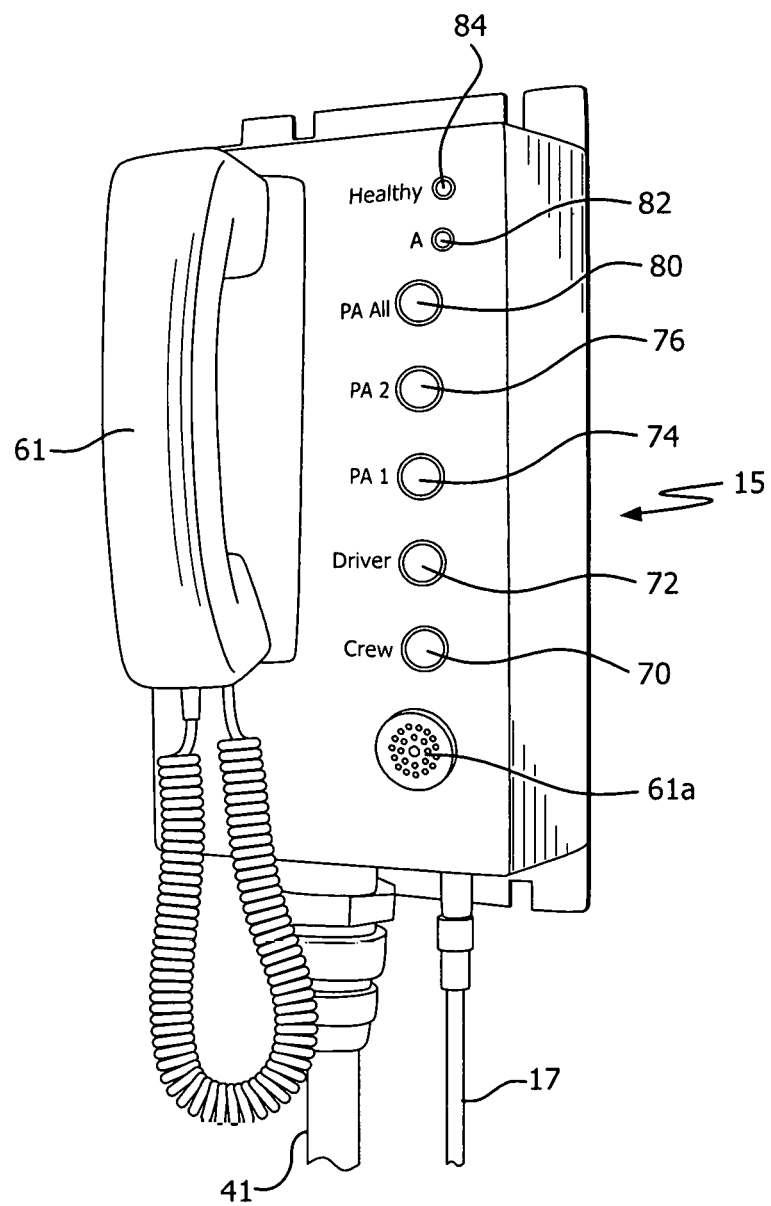
FIG. 13 depicts an IP-based on-board train telecommunications unit with dedicated hardwired input buttons and light emitting diode (LED) indicators in accordance with an in accordance with an illustrative embodiment.

Transit system communications such as on-board train communications have specific requirements to allow the crew to communicate with each other or the engineer (e.g., a driver and, in some cases, a driver and a guard for train cars having operators at each end thereof), as well as broadcast announcements to the passengers. For example, trains and other single or multiple car transit systems can be provided with a wireless or wired network of IP-based units 16 installed in the car(s). In addition, a single or multiple car train or other transit system can be provided with a wireless network access point to allow internet service to one or more of IP-based units 16. FIG. 13 depicts an example on-board train communications device 15 having a handset 61, speaker 61, power connection 41, Ethernet connection 17 and plural hardwired, dedicated buttons for calling the driver 72 or the crew 70, or for paging a particular zone 74 or 76 or all zones 80. Minimal status information is provided in the form of an LED 84 indicating health of the Ethernet connection 17, or other LED indicator 82 (e.g., to indicate with a call for aid has been initiated by a passenger). A call initiated from a crew member to other members of the crew can be established by the unit 16 as hybrid page-party function described above in connection with SP2. For example, the VoIP control module 44 is configured, upon receiving inputs from the activation of button 70 for a crew call and depression of the handset 61 pressbar, to direct audio from the caller as a page to crew members in one or more programmed zones and, upon release of the pressbar, to process the audio as party of a party line as described above in connection with an SP2 mode. The VoIP control module 44 is configured to respond to a button activation for a call to the driver 72 or a page (e.g., activation of button 74, 76 or 80) using the VoIP technology described above for establishing a point to point call or page.

On-board communication products often require training on how to use them, and there are several limitations on how calls are queued in each end-point or what information is available to the user regarding the status of incoming calls by other devices. For example, when a user of the on-board unit 15 in FIG. 13 initiates a call to the driver, the user has no indication if an incoming call exists from a crew member.

In accordance with an advantage of the unit 16 configured to operate as an on-board train communications device 16, the display 46 can provide specific instructions, as well as allow the user to see and select which incoming call is answered. Example screens 100 on the display 46 of the unit. 16 are provided in FIGS. 14 through 22. Since the unit 16 employs a touch screen 46 programmed with a graphical user interface (GUI) for indicators and input selection buttons, the same hardware and form factor can be used for units 16 having different operations and GUI screens intended for different types of users in accordance with a universal application platform 98 implementing the train communication system. Accordingly, the number of different types of units needed to implement a given communication system is reduced, and the inventory for replacements and repair is therefore also reduced.

As an example, a transit communications system having on-board IP-based units 16 can comprise a range of variants as listed in below that are connected together via an Ethernet network to provide audio communication of various types among various railway cars in a railway train, for example. The railway train can consist, for example, of a number of passenger cars, at least one passenger or coach car with a guard area, and power cars on either end of the train. The below listed variants of the on-board IP-based unit 16 are based on, for example, a common core printed circuit board (PCB) and common firmware (e.g., code executed by the microprocessor 92 in the control module 44 of each on-board unit 16) but are adapted by using different peripherals (e.g., GUI screen features) and electronic configuration (e.g., optional video cameras for point-to-point video conferencing) to produce different desired functionalities as described below in connection with FIGS. 14 through 22 and example use cases. As such, a number of advantages are realized by the configurability of IP-based unit 16 to provide one or more of plural selected functions using a common form factor such as obviating specialized hardware for various applications, thereby reducing manufacturing costs of the units 16 and simplifying inventory and acquisition of units for a particular system design and maintenance thereof. Illustrative variants of on-board IP-based units 16 are:

- a driver guard combination unit (DGC) (e.g., FIG. 14) that can be deployed for example in one or more of the passenger cars;
- a driver guard unit (DCU) (e.g., FIGS. 15 and 16) that can be deployed for example in each of the power cars;
- a driver guard unit with public address (PA) function (DGU-PA) (e.g., FIGS. 17 and 18) that can be deployed for example in each of the power cars;
- a signage unit (e.g., FIG. 19) that can be deployed as an EXIT sign, safety sign or other sign in any of the train cars;
- a public address announcer unit (PAA) (e.g., FIG. 20); and
- a passenger unit with web access (e.g., FIGS. 21 and 22) that can be deployed for example in one or more of the passenger cars.

In addition, the GUI of any of these variants can be programmed to display a Call for Aid (CFA) button in a GUI screen, or to generate a dedicated CFA GUI screen with button. When the button is activated, the IP-based unit 16 initiates a point-to-point or page call to one or more of a DGC, DCU, and DCU-PA to alert a crew member that assistance is needed. It is to be understood that other IP-based unit 16 variants can be provided. Example GUI screens for different variants are first described in connection with FIGS. 14 through 22, followed by different example use cases.

Figure 14:
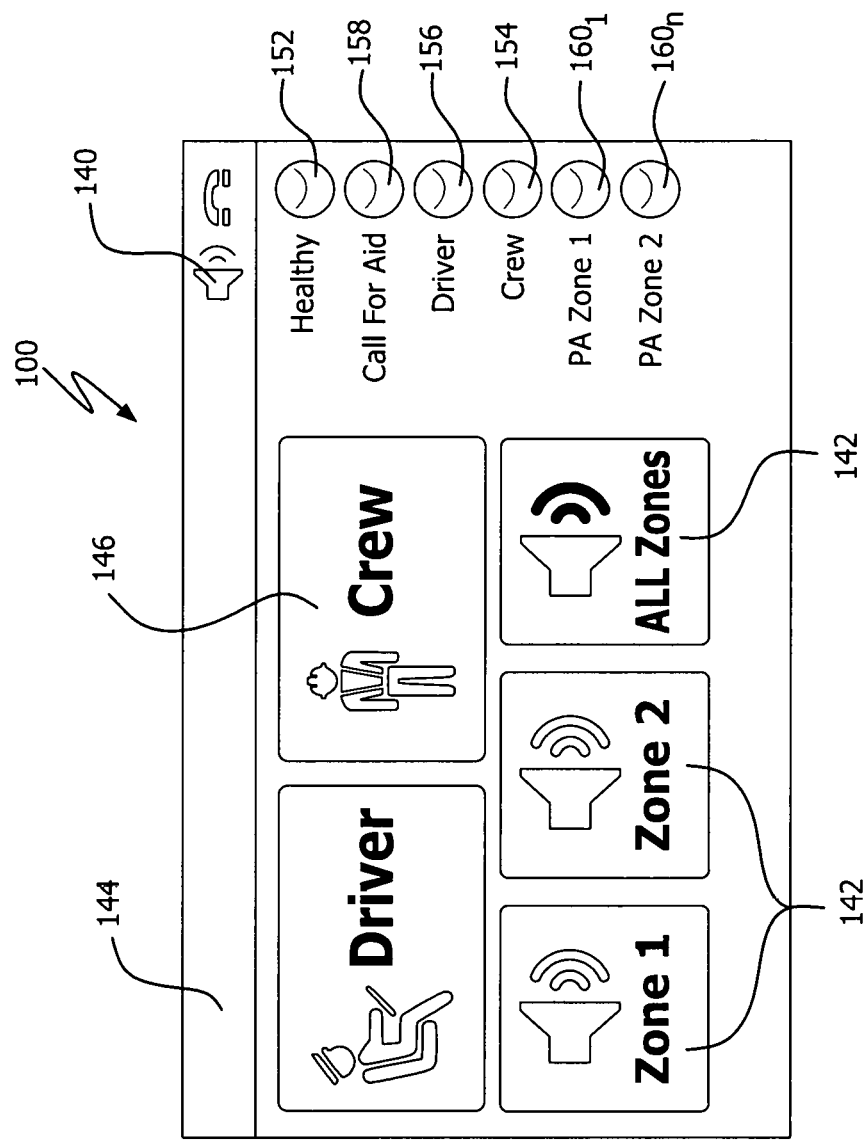
FIGS. 14, 15, 16, 17, 18, 19, 20, 21 and 22 depict graphical user interface (GUI) display screens generated by an IP-based communications unit having a universal application platform and universal form factor that performs on-board train telecommunications operations in accordance with in accordance with illustrative embodiments.

FIG. 14 depicts a GUI screen 100 on the display 46 providing an overall services screen 140 for a unit 16 configured for on-board communications such as a DGC configured for operation by a crew member of a train car. The home GUI screen 140 has a number of outputs or indicators that illuminate, respectively, for indicating, for example, whether the unit is healthy as indicated at 152 (e.g., see illuminated indicator 152 in FIG. 15 indicating that the Ethernet connection is strong) or malfunctioning (e.g., the Ethernet connection is weak or disconnected), whether a "Call for Aid" has been initiated at another unit 16 per indicator 158, whether the driver or crew is calling as indicated by 156 and 154, and whether Zone 1 is being paged per indicator $160_1$ or whether Zone 2 is being paged per indicator $160_n$. The unit 16 can also be configured to require other conditions to maintain the illumination of the healthy status indicator 152 and to discontinue activating the indicator 152 when one or more of selected conditions exists such as the unit not being configured, the handset 61 being off hook, while the unit is transmitting a PA announcement, and technical problems with the speaker $61a$ and/or the microphone $61b$ and/or the speaker amplifier. The home screen 140 for the on-board unit 16 also provides touch screen input buttons 142, 144 and 146, respectively, for selecting a zone for page announcements (e.g., zone 1, zone 2 or all zones), for calling the driver of a train and for calling the crew. The microprocessor 92 in the control module 44 is programmed to perform the point-to-point calls or page or party calls as described above, depending on which touch screen input button(s) are activated. The on-board unit 16 having a screen 140 as depicted in FIG. 14 is advantageous over the on-board unit 15 in FIG. 13 because the unit 16 can receive an indication from indicator 154 that a call is incoming from the crew, for example, as a user selects the button 144 to call the driver. The user can, in turn, terminate the call to the driver. Alternatively, the unit 16 can be programmed to give priority order to a hierarchy of call sources (e.g., driver call output in view of crew call input, crew call output in view of an incoming driver call or call from another crew member, and so on).

Figure 15:
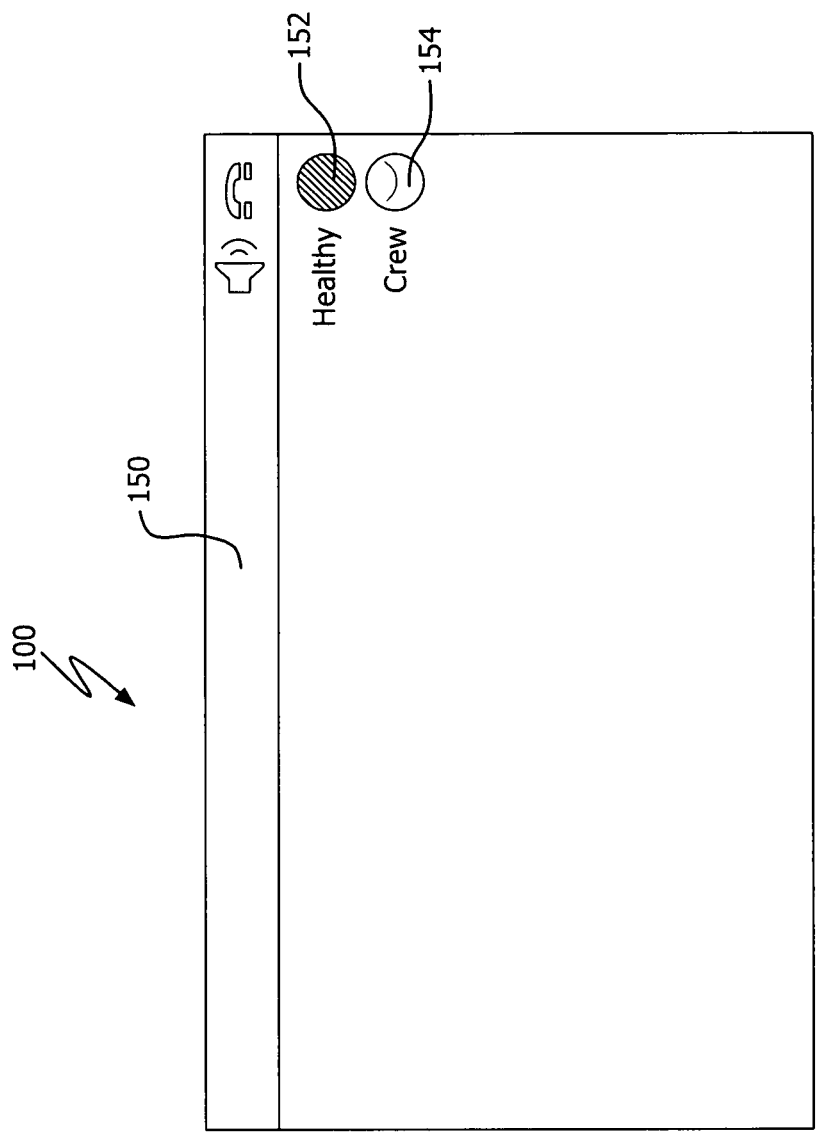
Figure 16:
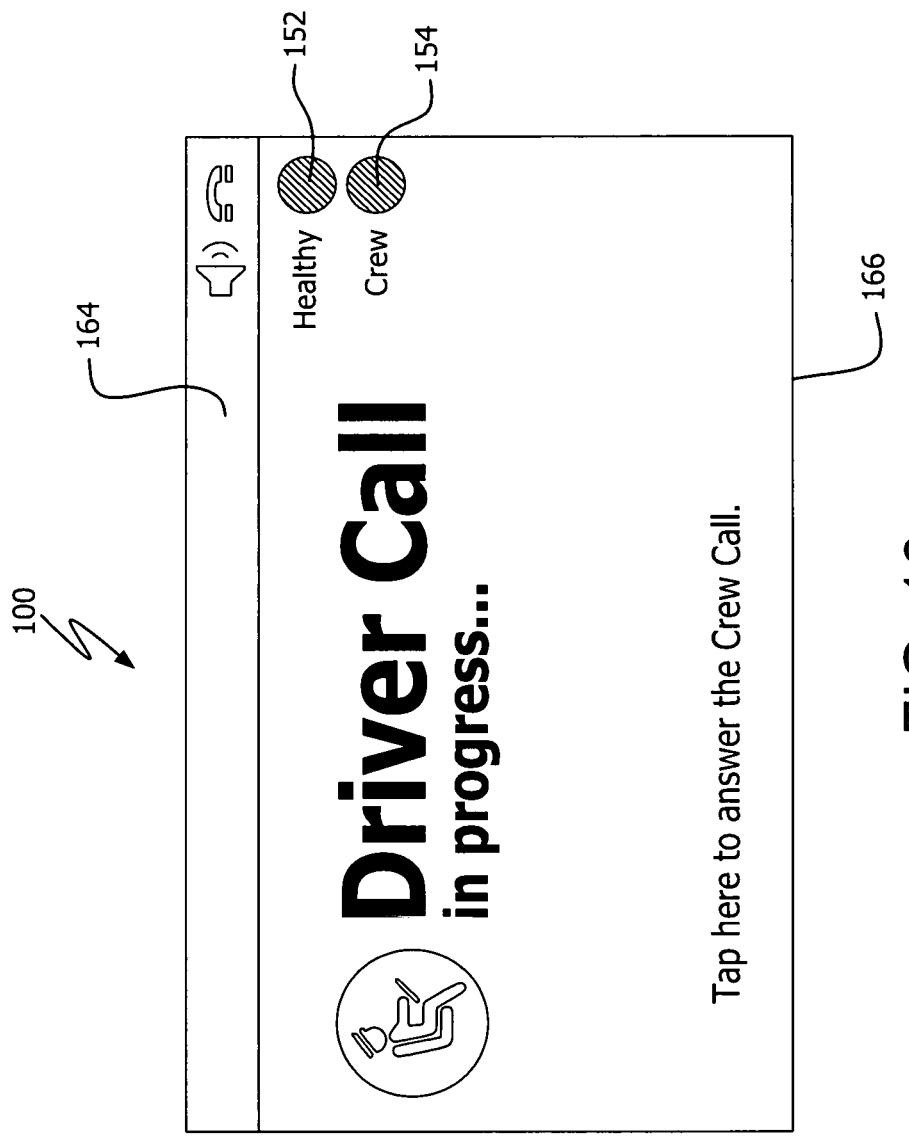

As shown in FIG. 15, a driver unit screen 150 (e.g. on an IP-based unit 16 configured as a DGU) can be configured to be simpler than a crew unit screen (e.g., 140) and indicate that the unit 16 is healthy via the illuminated indicator 152 and that the crew is not calling the driver as indicated via the non-illuminated indicator 154. As illustrated by the call in progress screen 164 on a driver unit in FIG. 16, if the user is engaged with a call in progress with the driver, and the unit 16 is receiving an incoming call from the crew, the crew indicator 154 is illuminated. Further, instructions 166 can be generated on the screen 100 to guide a user on how to handle the incoming call. In accordance with a universal application platform 98 configured for on-board communications, the control module 44 can be programmed to connect calls to the driver from crew members and party line calls from the driver to the crew members, and control the provision of instructions or other information for display on the GUI screens 100 of the different types of units (e.g., driver unit, or crew unit, or passenger unit with call for aid button) depending on the status of the calls in progress. In addition, where at least two of the units 16 are each provided with a video camera sensor and lens 48, corresponding units 16 can engage in a videoconference with their respective video images displayed via their corresponding screen displays 46.

Figure 17:
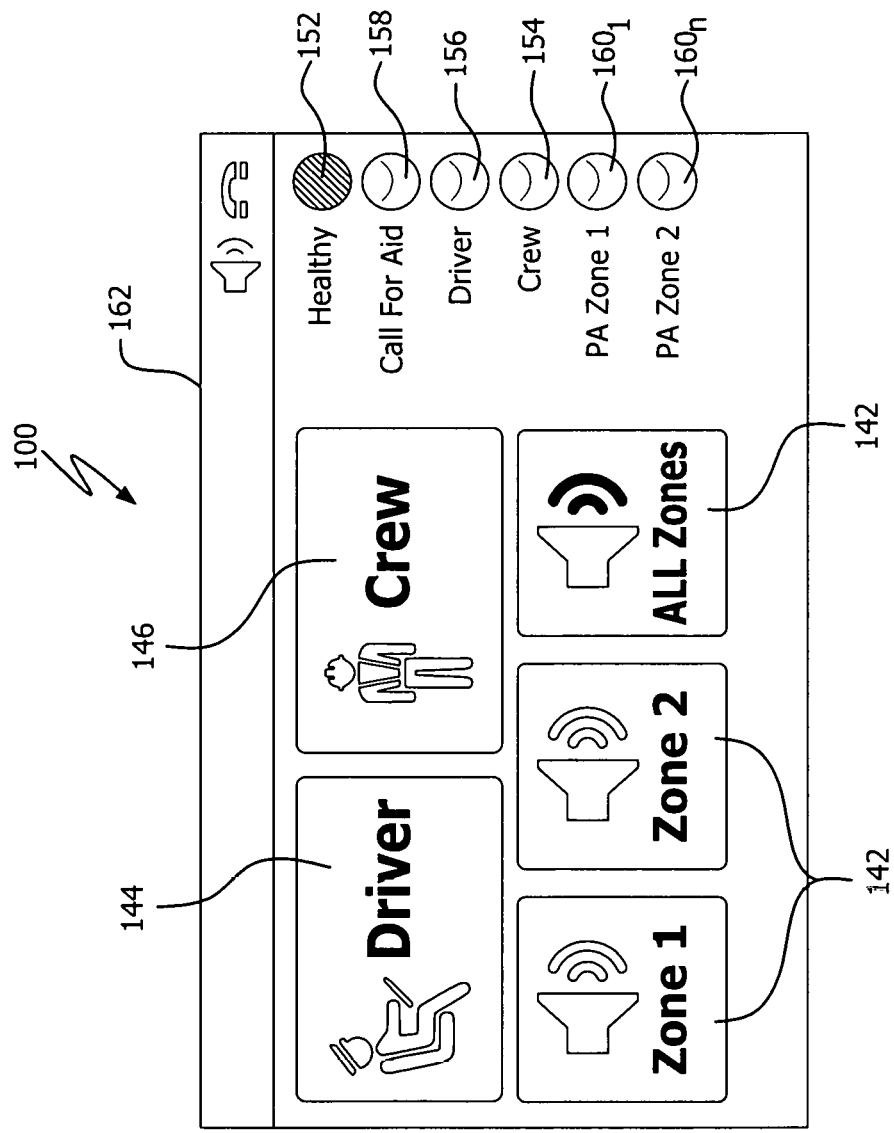
Figure 18:
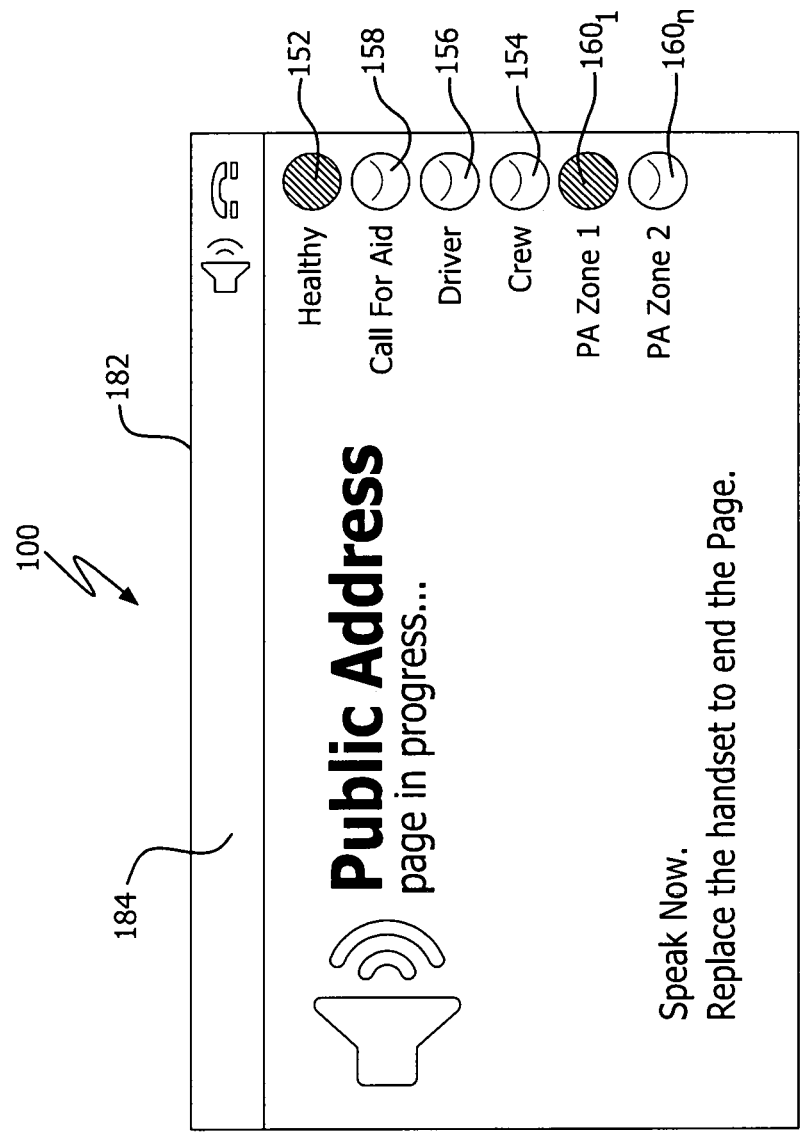

With reference to FIG. 17, a driver unit 16 (e.g., a DGU-PA) can be provided with a call and page screen 162 having the input touch screen buttons and indicators described above in connection with FIG. 14. In FIG. 17, the Healthy indicator 152 is illuminated to indicate that the Ethernet connection is good. If the user selects any of the page buttons 142 (e.g., the Zone 1), the corresponding PA Zone 1 indicator (e.g., $160_1$ is illuminated, as indicated in FIG. 18. Further, the unit 16 can be configured to generate instructions on the screen 182 for generating a page (e.g., "Speak Now. Replace with handset to end the Page."). As stated above, the UAP 98 can be programmed to provide a number of call processing decisions and pre-programmed instructions for output to the user on the screen 100 of the display 46.

Figure 19:
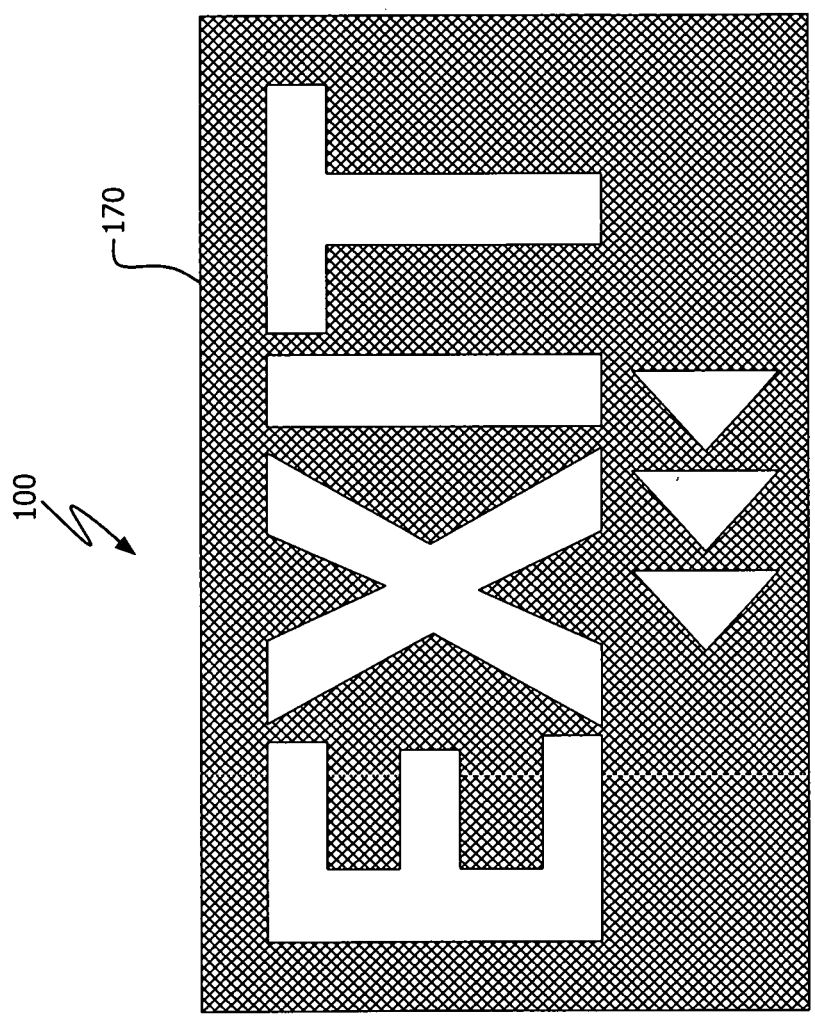

FIG. 19 illustrates how an on-board train communication unit 16 can be configured to employ its screen 100 on its display device 46 as an exit sign by the generation of an EXIT screen 170 with directional arrows to the nearest exit on the train car. Further, in the event of an incident, the unit 16 can become a public address announcer unit having screen 180 providing options for providing a public address announcement for output by speakers 61a of units 16 in different ones of plural zones or all zones. In addition, the unit 16 can be a black box of data for analyzing an incident since it can be configured to store status data relating to crew and driver calls and calls for aid.

Figure 20:
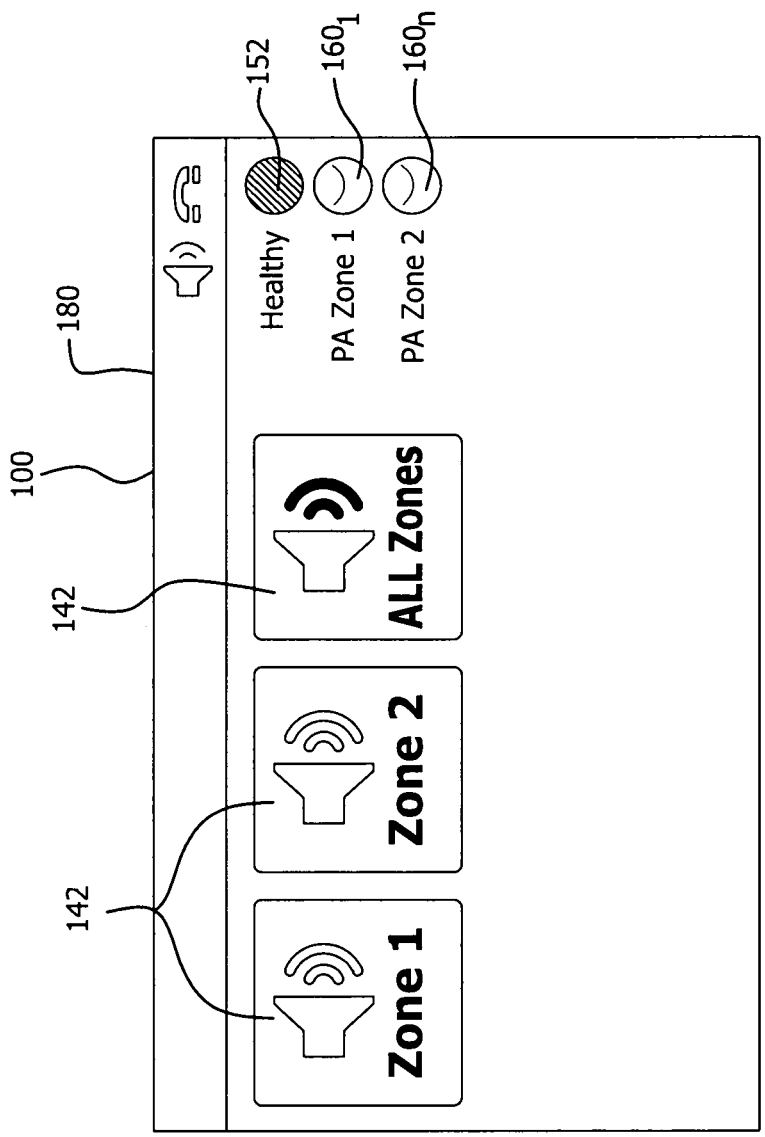

In addition, with reference to FIG. 20, units 16 configured to be a public address announcer unit can have GUI interface indicators and buttons for dialing or paging such as buttons 142 for selecting a zone for page announcements (e.g., zone 1, zone 2 or all zones) and indicators for indicating whether a Zone 1 is being paged per indicator $160_1$ or whether a Zone n is being paged per indicator $160_n$. A call initiated from a crew member to other members of the crew can be established by the unit 16 as a hybrid page-party function described above in connection with SP2. Touch screen indicators are an improvement to on-board train communication systems that comprise phone units having physical hardwired buttons for dialing and LEDs as indicators. The LEDs are limited and merely illuminate when the Ethernet connection to that phone unit is degraded or disconnected and possibly whether a call for aid has been made by a passenger. The unit 16 is configured to provide more information to the driver and crew members via the touch screen 46. A variety of indicators can be programmed into the UAP 98 of the unit 16 without requiring a hardware change. For example, indicators can illuminate or flash or change colors to convey when a crew call is being received while a user of the unit may be participating in another call. The unit 16 indicators can indicate to a user (e.g., a crew member) if a public address message has been generated for a particular zone or all of the zones by another user (e.g., another crew member). A crew member can also be alerted via the indicators if another crew member call is being received while that crew member is engaged in another call with the driver.

Figure 21:
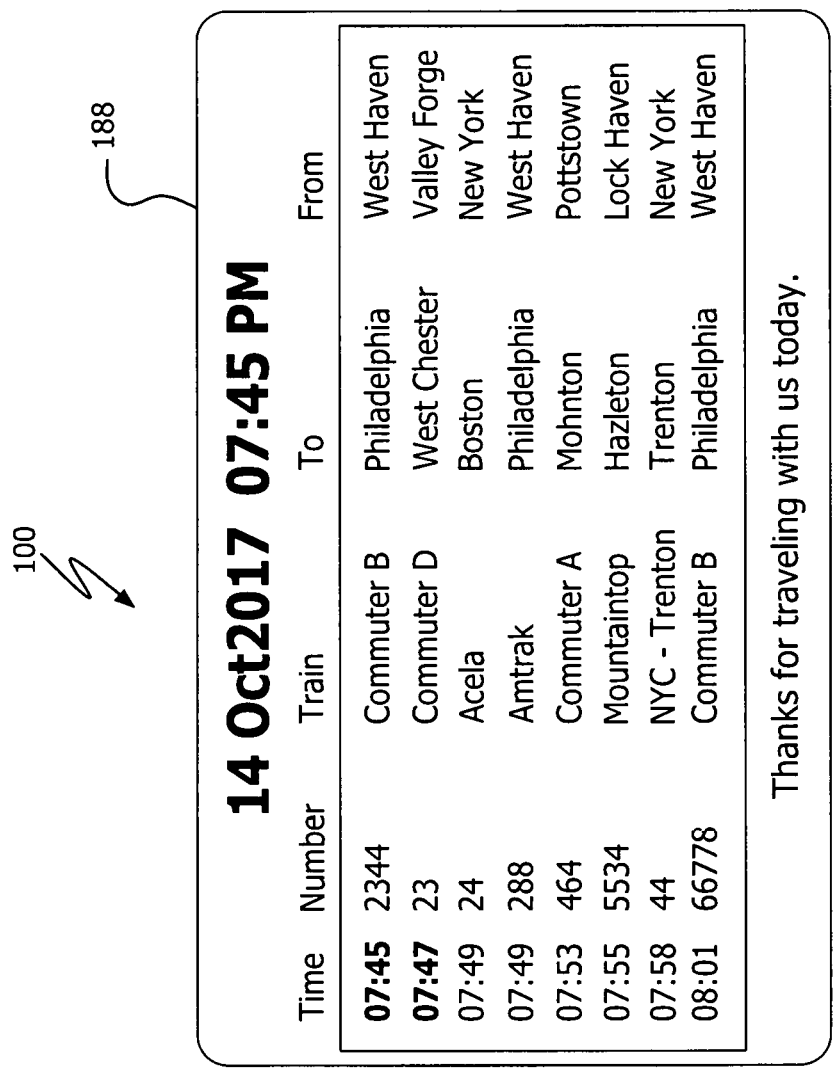
Figure 22:
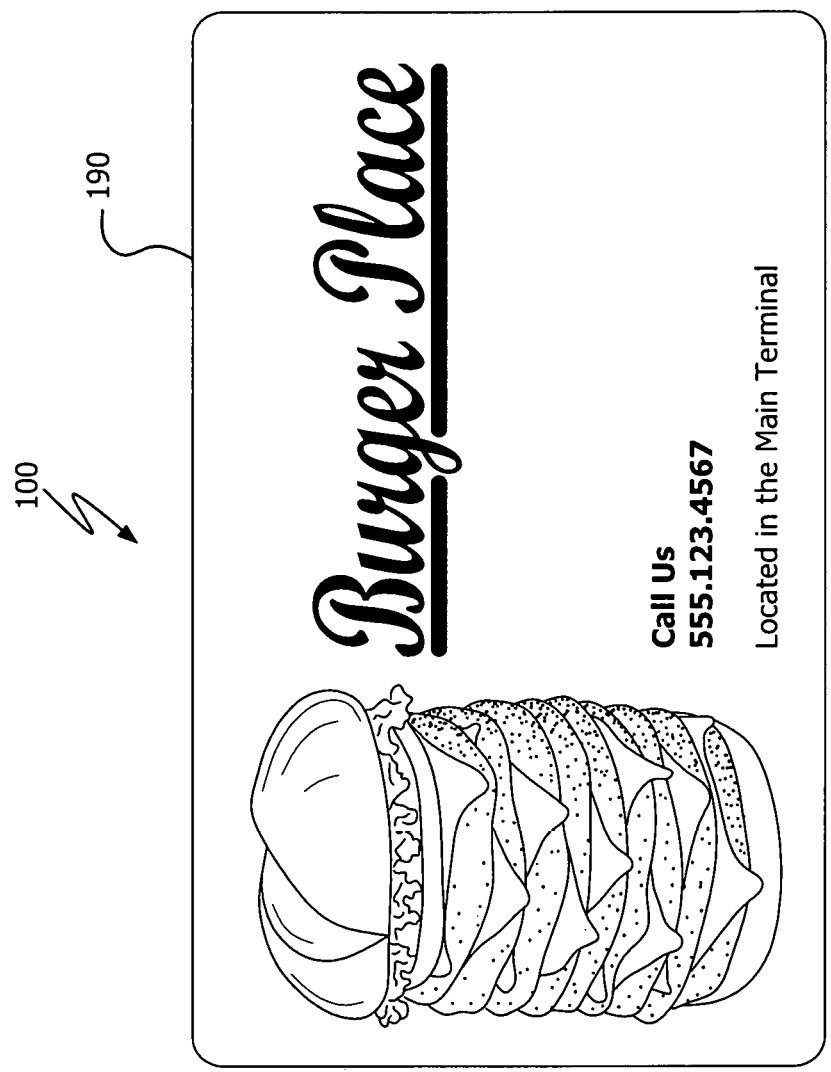

Since the unit 16 is connected via an Ethernet port or interface 14 to an Ethernet network and has a WiFi interface 60 for connecting to other network-enabled devices, the unit can be configured as to operate in an access point mode that provides a local Ethernet connection to the internet for the other devices communicating to the unit 16 via WiFi, for example, or other wireless communication protocol. For example, as indicated in FIG. 21, a passenger unit 16 can be provided with buttons configured by the control module 44 to go to a web server to get selected content (e.g., a train schedule, local station maps, local events or hotels). Similarly, a passenger unit 16 can be provided with selected content such as advertisements by the control module 44 as indicated in FIG. 22. The wireless interface 60 on a unit 16 allows a passenger smart phone with app to communicate with the unit to call for a train attendant or crew member, which can be useful in a train car where the user does not have access to a unit 16 designed as a Call for Aid unit.

Example Use Cases of IP-Based Transit Communications Units 16

The following use cases of different variants of IP-based units 16 deployed in a transit system (e.g., a multiple car railway train) shall be described with reference to the SP2 page/party and point-to-point call operations described above in a serverless system (e.g., a transit system that does not employ a SIP server or for page/party and point-to-point calls among drivers and crew members in the transit system). For example, each of the units 16 is assigned an IP address and is operated as a serverless page/party SP2 unit via software executed by the microprocessor 92 in the control module 44 such that the transit system units 16 are configured to be self-aware of each other via the mutual provisioning mode distribution of a system configuration to these units 16 that designates unit IP addresses and multicast addresses of page and party line sockets, as described above in connection with the SP2 operation of an IP-based unit 16 and in accordance with the page zones designated among the units 16 (e.g., based on variant-type or location) and party lines between crew members and driver(s).

Initiating and Receiving Calls at a Driver Unit 16 (e.g., DGU)

A driver initiates a call at an IP-based unit 16 configured to operate as a DGU by picking up the handset 61 (e.g., if the unit 16 is provided with a handset 61) or by pressing a call button generated via the display 46. All capable crew units 16 (e.g., DGC and DGU-PA) ring and a 'driver' indicator 156 flashes on the screens (e.g., screens 140, 162 and 182) of these crew units. When a crew member picks up the handset 61 of a DGC or DGU-PA to auto answer the call, the other units stop ringing once the call is connected and the 'driver' indicator 156 is illuminated on all crew units while the call is in progress. Call order can be push-to-talk (PTT) on both the transmitting/caller and receiving/called party ends. If a second crew member picks up the handset 61 on a different crew unit during that conversation, then they can press a 'driver' button 144 to join the conversation. The call ends when the driver hangs up or less than two participants are active. If two crew members remain on the call, the transit system can be optionally configured to convert the driver call to a crew call. If the driver does not get a response after a selected amount of time (e.g., 10 seconds), the driver unit can be programmed to generate a PA announcement (e.g., "Would a member of the train crew please contact the driver?"). The driver hears the same message in the earpiece of the DGU and can either keep the phone or unit 16 off hook and wait for a crew member to answer (i.e., capable crew units continue to ring/flash until the call is connected), or put the handset 61 down and wait for a crew member to call in, in which case the driver call is cancelled and crew member initiates the call.

Initiating and Receiving Calls at a Crew Unit 16 (e.g., DGC, DGU-PA)

Crew units can be configured with prioritization among multiple incoming calls. For example, when the handset 61 of a crew unit 16 is lifted or otherwise taken off-hook, a call from a driver can be prioritized over a call for aid (CFA), which can be prioritized over an incoming call from another crew member.

When a crew member initiates a call to the driver from the crew unit 16, the crew member takes the handset off-hook and presses the driver button 144. The driver can, in turn, pick up the handset 61 on the DGU to answer the call. On the other hand, if a second crew member picks up the handset 61 on their corresponding crew unit 16 during this conversation, the second crew member can (a) auto answer the next call in priority queue if the unit 16 is ringing (e,g., a 'CFA' indicator 158 or 'crew' indicator 154 is flashed to indicate which call is waiting); (b) press the 'driver' button 144 to join the conversation; (c) press the 'crew' 146 button to make a separate crew to crew call; or (d) press relevant 'PA' buttons 142 to make a PA announcement to one or all zones. The call can be PTT format at both ends. The call ends when the driver hangs up or less than two participants are active.

When a crew member initiates a call from a first crew unit 16 to a second crew unit 16, the crew member takes the handset off-hook and presses the crew button 146 on the first crew unit 16. All capable crew units (e.g., DGU-PA and DGC) generate a ring and a 'crew' indicator 154 flashes on these units 16. A crew member picks up a handset 16 on another unit 16 to auto answer call. The other crew units 16 stop ringing once the call is connected and the 'crew' indicator 154 is activated (e.g., constant-on) on all these crew units while the call is in progress. If a third crew member picks up the handset 61 on another unit during that conversation, then they can (a) auto answer the next call in priority queue if the unit 16 is ringing (e,g., a 'CFA' indicator 158 or 'driver' indicator 156 is flashed to indicate which call is waiting); (b) press the 'crew' button 146 to join the conversation; (c) press the 'driver' 144 button to make a separate crew to driver call; or (d) press relevant 'PA' buttons 142 to make a PA announcement to one or all zones. The call can be PTT format at both ends. The call ends when there are less than two active participants.

Right Away Protocol for Transit System Dispatches

The driver and guard units 16 (e.g., DGUs deployed at the power cars of a train) can be configured with a buzzer or other alarm (e.g., a separate audio component or audio stored in digital memory for playback) that is activated in response to a corresponding buzzer or alarm button generated on the touch screen 46 in accordance with a Right aWay (RW) protocol. The RW protocol is a manual protocol used between the driver and the guard on a train to ensure that the train is safe to dispatch (e.g., from a platform once all passengers are confirmed to have boarded). Historically, this protocol has entailed a coded sequence of signals using a buzzer. For example, the guard buzzes twice to indicate that all passengers have boarded and the doors are closed. The driver then buzzes twice to indicate that the guard's buzzer signal has been received. The guard then buzzes twice again to confirm. The driver does not start the train moving until the second two buzzes from the guard are heard.

Data Terminal

Some facilities can be designed to allow connection to external devices using I/O, CAN Bus, RS485, WiFi or many other protocols or other analog interfaces such as analog video or audio. These types of installations can take data in or send data out to an external device using a UDP packets sent/received by the unit 16. This configuration allows connection to other devices utilizing the same Ethernet cable as the unit 16, which further reduces installation costs to the end user or end-customer acquiring components to install a IP-based communications system. Alternatively, the external device can be wirelessly connected to the unit 16. Further, the external user interface port 50 can be used to control an external pan/tilt analog camera for streaming a unit 16's camera video over our Ethernet.

The units 16 can be deployed for example at different locations in a building and connected to an Ethernet network to provide local nodes or access points. Network-enabled devices such as occupancy sensors and environmental sensors can communicate with a unit 16 configured as an access point to the Ethernet network to send data to the cloud, that is, to a remote monitoring system via the internet, for example. The units 16 therefore allow for the networked devices to operate in a baseless system, unlike prior building monitoring systems that require all devices to connect to the same local base unit that, in turn, may or may not connect to a remote monitoring system. The network-enabled devices can be Internet of Things (IoT) devices, for example, configured for implementing a smart building in terms of sensing environmental and/or occupancy conditions for environment control (e.g., HVAC, motorized window coverings) and/or security purposes. The building need not have WiFi connectivity throughout, which can be difficult to achieve in some building structures, since placement of a number of the units 16 within range of these network-enabled devices as local nodes provides WiFi connectivity and internet access. In addition, the unit 16 can be configured to receive via the Ethernet network and Ethernet interface 14 commands (e.g., to control a device such as a thermostat for HVAC, or a camera or door lock for a security system) for transmission to the network-enabled devices via the WiFi interface 60.

For example, a unit 16 can be provided at a locked entrance to the building and programmed to operate in a point-to-point communication mode (FIGS. 10 and 11) or in a point-to-point video call mode (FIG. 12) with a unit 16 provided at a security guard station in the building. For example, the unit 16 can have a simple screen with only one button to press to initial the call to the security desk unit 16. Alternatively, the visitor unit can be preconfigured by its control module 44 to hot dial the security unit upon removal of a handset from its cradle on the visitor unit. The point to point call between a visitor and a security guard can result in the guard using his unit 16 to generate a signal via the WiFi interface 16 to remotely unlock a network-enabled lock on a door and permit the visitor to enter the building. The guard unit 16 can also be programmed with buttons for dialing the units 16 of respective various tenants or other personnel in the building to announce the arrival of the visitor.

The units 16 can be implemented in the form factor of desktop phones connected to a building's Ethernet network and have local alarm functionality that obviates installation of separate public address/speaker system in building. For example, the units 16 can be configured to operate as a public address and alarm (PAA) system that can communicate audible alarms and pages via the speaker 61 on the unit 16. The units 16 can also be provided with alarm or announcement-related messages (e.g., "This alarm is only a test") in a GUI screen 100 generated on the touch screen display 46. In addition, the units 16 can be configured to allow a user to receive and provide audio via a Bluetooth-enabled headset paired with the wireless interface 60. In addition, the units 16 can be configured to allow a user to download contacts from their smartphone to the unit 16 via the wireless interface 60.

Advantages of Configurable, Multi-Function IP-Based Units 16

It is to be understood that the mode selection buttons 102 can include fewer or more mode buttons than the 4 mode buttons 104, 110, 118 and 126 described above, as well as relate to different operational modes than the modes indicated in FIGS. 6-12, or the different user modes in connection with the on-board communication units described in connection with FIGS. 14-22.

The VoIP units 15 and 16 are fully functional SIP VoIP phones. The VoIP units 16 described herein operate in various modes that can be remotely configured such as by providing commands or updated software instructions via one of the interfaces described above in connection with FIG. 5 (e.g., WiFi 60 or external user interface port 50).

Configurable, multi-function IP-based Units 16 with touch screen displays in accordance with example embodiments of the present invention are advantageous in that one form factor is operable as a number of devices having different functions for versatility and simplicity in communication system installations. By the addition of a touch screen display, the abilities of a serverless station or unit 16, for example, become much more broad in that, not only can the unit 16 be used as a more capable page/party station, but the unit 16 can also be used as a VoIP telephone (i.e., where a SIP server is required), an access panel for activating alarms on a PA/GA system, a point-to-point (e.g., serverless) intercom, or a video capture device to stream video from the station's perspective to a central video switch/controller. In addition, adding hands free capabilities further enhances the unit 16 in various applications.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrative embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing illustrative embodiments of the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), a system on chip (SOC), an Application Specific Integrated Circuit (ASIC), a Field Programmable Gate Array (FPGA)

or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in the remote station, Electronic medical device, a server, or a combination thereof. In the alternative, the processor and the storage medium may reside as discrete components in a user terminal.

The previous description of the disclosed embodiments is provided to enable any person skilled in the art to make or use illustrative embodiments of the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

The invention claimed is:

1. A configurable, multi-function voice over internet protocol (VoIP) unit comprising:
a VoIP control module for controlling VoIP operations of the VoIP unit with respect to other VoIP units in an Internet Protocol (IP) network, the VoIP control module being configured to operate the VoIP unit in a plurality of modes by selectively participating in at least one of point-to-point communication between the VoIP unit and another one of the VoIP units in the IP network and multicast communication between the VoIP unit and a plurality of the VoIP units depending on which of the plurality of modes the VoIP unit is currently operating in, the plurality of modes comprising at least two of a VoIP telephone mode, a serverless page-party (SP2) station mode, and an access panel mode that provides alarm activation and public address emergency broadcasts to selected zones via an IP network;
a speaker coupled to the VoIP control module and configured for audio output;
a microphone coupled to the VoIP control module and configured to receive audio input;
a touch screen display coupled to the VoIP control module and configured to operate a graphical user interface to generate display screens corresponding to the currently selected one of the plurality of modes and to receive user inputs via the display screens, at least one of the display screens comprises operational mode selection buttons corresponding to respective ones of the plurality of modes, the VoIP control module being configured to respond to activation of any of the operational mode selection buttons by operating the VoIP unit in accordance with the corresponding one of the plurality of modes; and
an IP network interface module connected to the VoIP control module and the IP network and configured to exchange bi-directional Ethernet data between the IP network and the VoIP control module and to condition audio signals received the IP network for output via the speaker and to condition audio signals input via the microphone for transmission via the IP network.

2. A configurable, multi-function VoIP unit as recited in claim 1, wherein the touch screen display comprises a panel screen made from an impact-resistant material.

3. A configurable, multi-function VoIP unit as recited in claim 1, wherein the touch screen display comprises a touch screen optically bonded to a liquid crystal display, the optical bond removing any air gap between the touch screen and the liquid crystal display.

4. A configurable, multi-function VoIP unit as recited in claim 1, wherein the VoIP unit further comprises a ruggedized housing having the touch screen display mounted thereto on an external surface thereof and configured in accordance with Class 1, Division 2 classification in the National Fire Protection Association (NFPA) Publication 70, National Electric Code® (NEC).

5. A configurable, multi-function VoIP unit as recited in claim 1, further comprising a video camera sensor and lens, and the VoIP control module is configured to send video call data from the video camera sensor and lens to at least one of the VoIP units in the IP network and to receive video call data from the at least one of the VoIP units that also comprises a video camera sensor and lens.

6. A configurable, multi-function VoIP unit as recited in claim 1, wherein, when the VoIP unit is configured to operate in the VoIP telephone mode, the touch screen display is configured to generate at least one graphical user display screen providing at least one input button selected from the group consisting of a telephone keypad of numbered buttons to place dial-pad telephone calls, at least one button to place an auto-dialed call, a directory lookup table that allows the user to select and auto-dial a listed call recipient, a button for placing a multiple line call, and a button for call transfer, the VoIP control module being configured to establish at least one of the point-to-point communication and the multicast communication with at least one of the other VoIP units depending on activation of the at least one input button.

7. A configurable, multi-function VoIP unit as recited in claim 1, wherein, when the VoIP unit is configured to operate in the SP2 mode, the touch screen display is configured to generate at least one graphical user display screen providing at least one input button selected from the group consisting of buttons corresponding to respective ones of a plurality of party lines, and buttons for selecting at least one paging destination, wherein the paging destination buttons are labeled with at least one of a zone number and an alphanumeric destination name, the VoIP control module being configured to establish at least one of the point-to-point communication and the multicast communication with corresponding ones of the other VoIP units depending on activation of the at least one input button.

8. A configurable, multi-function VoIP unit as recited in claim 1, wherein, when the VoIP unit is configured to operate in the access panel mode, the touch screen display is configured to generate at least one graphical user display screen providing at least one input button selected from the group consisting of buttons corresponding to different zones to select to receive a broadcast or intercom message, buttons corresponding to respective different types of alarms, and access panel control buttons for at least one of alarm cancel, acknowledgement, mute, and type of speech, the VoIP control module being configured to establish at least one of the point-to-point communication and the multicast communication with corresponding ones of the other VoIP units depending on activation of the at least one input button.

9. A configurable, multi-function VoIP unit as recited in claim 1, wherein, when the VoIP unit is configured to operate in the serverless point-to-point intercom mode, the touch screen display is configured to generate at least one graphical user display screen providing a directory lookup table that allows the user to select and dial a listed call recipient, the VoIP control module being configured to establish the point-to-point communication with corresponding ones of the other VoIP units depending on activation of respective call recipient buttons in the directory lookup table.

10. A configurable, multi-function VoIP unit as recited in claim 1, wherein the VoIP control module is configured to operate the VoIP unit in a transit system communication mode selected from the group consisting of a driver communication mode for establishing calls from a driver to crew members, a crew communication mode for establishing calls from at least one of the crew members to the driver or another one of the crew members, a passenger communication mode for establishing calls from a passenger to at least one of the crew members, and a public address mode for transmitting an announcement to the other VoIP units.

11. A configurable, multi-function VoIP unit as recited in claim 10, further comprising a handset having the speaker and the microphone, and a cradle configured to operate a switch that, when the handset is removed from the cradle, generates a signal to the VoIP control module to initiate at least one of a page and a party call to at least one of the VoIP units operated by a crew member, when the VoIP unit is configured to operate in the driver communication mode.

12. A configurable, multi-function VoIP unit as recited in claim 10, wherein the touch screen display is configured to generate at least one graphical user display screen providing a selection button to initiate a call to at least one of the VoIP units operated by a crew member and, in response to activation of the selection button, when the VoIP unit is configured to operate in the driver communication mode.

13. A configurable, multi-function VoIP unit as recited in claim 10, wherein, when the VoIP control module is configured to operate in the transit system communication mode, the VoIP control module operates via the SP2 station mode to connect VoIP units operated by respective ones of the driver and crew members by distributing a system configuration among the VoIP unit and the other VoIP units that designates IP addresses to respective ones of the VoIP unit and the other VoIP units and designates multicast addresses of page and party line sockets employed by the VoIP unit with respect to the other VoIP units to participate in party calls between the driver and crew members and to provide page announcements via the VoIP units.

14. A configurable, multi-function VoIP unit as recited in claim 13, wherein, when the VoIP unit is configured in accordance with the SP2 station mode, the VoIP control unit is configured to be self-aware of other VoIP units by using a common channel to send or receive the system configuration.

15. A configurable, multi-function VoIP unit as recited in claim 10, wherein, when the VoIP unit is configured to operate in the crew communication mode, the touch screen display is configured to generate at least one graphical user display screen providing at least one input button selected from the group consisting of a driver call button, a crew member call button, at least one page zone button, and a page all zones button, the VoIP control module being configured to establish at least one of the point-to-point communication and the multicast communication with corresponding ones of the other VoIP units depending on activation of the at least one input button.

16. A configurable, multi-function VoIP unit as recited in claim 10, wherein, when the VoIP unit is configured to operate in the crew communication mode, the touch screen display is configured to generate at least one indicator indicating that the VoIP unit has a connection to the IP network, and when an incoming call is being received from at least one of the driver, another crew member, a call for aid button activated on one of the VoIP units, and a page established on one of the VoIP units.

17. A configurable, multi-function VoIP unit as recited in claim 10, wherein, when the VoIP unit is configured to operate in a driver communication mode, the touch screen display is configured to generate at least one graphical user display screen indicating that the VoIP unit has established a driver call to the VoIP units being operated by crew members, and to generate at least one indicator indicating that the VoIP unit has an incoming call from one of the VoIP units being operated by a crew member and at least one input screen area to activate to answer the incoming call during the driver call.

18. A configurable, multi-function VoIP unit as recited in claim 10, wherein, when the VoIP unit is configured to operate in the driver communication mode, the touch screen display is configured to generate at least one indicator selected from the group consisting of an indicator indicating that the VoIP unit has a connection to the IP network, and an indicator indicating that an incoming call is being received from one of the VoIP units being operated by a crew member.

19. A configurable, multi-function VoIP unit as recited in claim 10, wherein, when the VoIP unit is configured to operate in the public address mode, the touch screen display is configured to generate at least one graphical user display screen indicating when a page address is being generated.

20. A configurable, multi-function VoIP unit as recited in claim 19, wherein, when the VoIP unit is configured to operate in the crew communication mode, the touch screen display is configured to generate at least one indicator indicating that the VoIP unit has a connection to the IP network, and that an incoming call is being received from at least one of the driver, another crew member, a call for aid button activated on one of the VoIP units, and a page established on one of the VoIP units.

21. A configurable, multi-function VoIP unit as recited in claim 10, wherein, when the VoIP unit is configured to operate in the passenger communication mode, the touch screen display is configured to generate at least one graphical user display screen indicating at least one of an advertisement, and an exit sign having at least one of alphanumeric characters and directional arrows relating to an exit from the transit system.

22. A configurable, multi-function VoIP unit as recited in claim 10, wherein, when the VoIP unit is connected to a wireless communication access point, the touch screen display is configured to display information received via internet.

23. A configurable, multi-function VoIP unit as recited in claim 1, wherein the plurality of modes further comprises at one of a party line call mode, a video call mode, and a serverless point-to-point intercom mode.

24. A configurable, multi-function VoIP unit as recited in claim 1, wherein each of the display screens comprises the operational mode selection buttons and at least one input button that corresponds to the selected one of the plurality of modes selected via the activated operational mode selection button.

\* \* \* \* \*